United States Patent
Gupta et al.

(10) Patent No.: US 12,530,690 B2
(45) Date of Patent: Jan. 20, 2026

(54) ARTIFICIAL INTELLIGENCE-BASED FRAUD AND RISK MANAGEMENT METHODS AND SYSTEMS FOR ACQUIRERS

(71) Applicant: MASTERCARD INTERNATIONAL INCORPORATED, Purchase, NY (US)

(72) Inventors: Smriti Gupta, New Delhi (IN); Adarsh Patankar, Betul (IN); Akash Choudhary, Delhi (IN); Alekhya Bhatraju, Gudivada (IN); Ammar Ahmad Khan, Gautam Buddh Nagar (IN); Amrita Kundu, Siliguri (IN); Ankur Saraswat, Gurgaon (IN); Anubhav Gupta, Lucknow (IN); Awanish Kumar, Lucknow (IN); Ayush Agarwal, Roorkee (IN); Brian M. McGuigan, Mamaroneck, NY (US); Debasmita Das, Kolkata (IN); Deepak Yadav, Gurgaon (IN); Diksha Shrivastava, Indore (IN); Garima Arora, Delhi (IN); Gaurav Dhama, Gurgaon (IN); Gaurav Oberoi, Meerut (IN); Govind Vitthal Waghmare, Pune (IN); Hardik Wadhwa, Bangalore (IN); Jessica Peretta, Purchase, NY (US);

(Continued)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 164 days.

(21) Appl. No.: 18/482,733

(22) Filed: Oct. 6, 2023

(65) Prior Publication Data

US 2024/0119457 A1    Apr. 11, 2024

(30) Foreign Application Priority Data

Oct. 7, 2022    (IN) .............................. 202241057590

(51) Int. Cl.
*G06Q 20/40* (2012.01)

(52) U.S. Cl.
CPC .............................. *G06Q 20/4016* (2013.01)

(58) Field of Classification Search
CPC .............................................. G06Q 20/4016
(Continued)

(56) References Cited

U.S. PATENT DOCUMENTS

| 2008/0140576 A1 | 6/2008 | Lewis et al. |
| 2011/0225076 A1 | 9/2011 | Wang et al. |

(Continued)

*Primary Examiner* — Lindsay M Maguire
(74) *Attorney, Agent, or Firm* — Jordan IP Law, LLC

(57) ABSTRACT

Methods and server systems for computing fraud risk scores for various merchants associated with an acquirer described herein. The method performed by a server system includes accessing merchant-related transaction data including merchant-related transaction indicators associated with a merchant from a transaction database. Method includes generating a merchant-related transaction features based on the merchant-related indicators. Method includes generating via risk prediction models, for a payment transaction with the merchant, merchant health and compliance risk scores, merchant terminal risk scores, merchant chargeback risk scores, and merchant activity risk scores based on the merchant-related transaction features. Method includes facilitating transmission of a notification message to an acquirer server associated with the merchant. The notification message includes the merchant health and compliance risk scores, the merchant terminal risk scores, the merchant chargeback risk scores, and the merchant activity risk scores.

20 Claims, 9 Drawing Sheets

(72) Inventors: Kanishk Goyal, Alwar (IN); Karthik Prasad, Kochi (IN); Lekhana Vusse, Rajahmundry (IN); Maneet Singh, New Delhi (IN); Niranjan Gulla, Visakhapatnam (IN); Nitish Kumar, Jamshedpur (IN); Rajesh Kumar Ranjan, Madhubani (IN); Ram Ganesh V, Ernakulam (IN); Rohit Bhattacharya, Kolkata (IN); Rupesh Kumar Sankhala, Churu (IN); Siddhartha Asthana, New Delhi (IN); Soumyadeep Ghosh, Gurgaon (IN); Sourojit Bhaduri, Jamshedpur (IN); Srijita Tiwari, Lucknow (IN); Suhas Powar, Kolhapur (IN); Susan Skelsey, Chappaqua, NY (US)

(58) Field of Classification Search
USPC .......................................................... 705/44
See application file for complete search history.

(56) References Cited

U.S. PATENT DOCUMENTS

| | | |
|---|---|---|
| 2012/0136784 A1 | 5/2012 | Galit et al. |
| 2015/0106260 A1* | 4/2015 | Andrews ............ G06Q 20/4016 |
| | | 705/39 |
| 2016/0196559 A1 | 7/2016 | Einhorn et al. |
| 2020/0074471 A1* | 3/2020 | Adjaoute ............... G06Q 40/12 |
| 2020/0211019 A1* | 7/2020 | Allbright ............... G06N 20/10 |
| 2020/0211021 A1* | 7/2020 | Allbright ........... G06Q 20/4016 |
| 2020/0211022 A1* | 7/2020 | Allbright ............ H04L 63/1408 |
| 2021/0248614 A1 | 8/2021 | Adjaoute |

* cited by examiner

ARTIFICIAL INTELLIGENCE-BASED FRAUD AND RISK MANAGEMENT METHODS AND SYSTEMS FOR ACQUIRERS

CROSS REFERENCE TO RELATED APPLICATIONS

The present application claims priority to IN Provisional Application No. 202241057590 filed Oct. 7, 2022, which is hereby incorporated by reference in its entirety.

TECHNICAL FIELD

The present disclosure relates to artificial intelligence-based processing systems and, more particularly to, electronic methods and systems for fraud and risk management for acquirer banks.

BACKGROUND

Acquiring banks, commonly known as acquirers, are financial institutions that process payment transactions for merchants (e.g., physical stores, institutions, etc.). Such payment transactions are generally initiated by a cardholder with the merchant using a payment instrument (such as payment cards (credit cards, debit cards, etc.)) in exchange for goods and/or services. Over the last few years, the payment ecosystem has been expanding rapidly. In particular, the acquiring banks are bringing millions of new merchants into the payment universe. As the number of merchants is rapidly increasing, it has become very challenging for acquiring banks to manage and control the frauds and/or risks associated with payment transactions.

Additionally, merchant fraud can be very difficult to detect due to the complex nature of the payment ecosystem. The merchant-related frauds can cause huge financial losses to the acquiring banks. For example, it is estimated that around $200 million have been stolen from banks between 2003 and 2013 as a result of merchant-related frauds. Further, merchant-related fraud exposes the acquirers to the potential liability of facilitating criminal activities (such as money laundering) and places them at significant risks such as reputational damage, potential regulatory sanctions, legal actions by regulatory bodies, and the like. In one example, it is estimated that around 11 k merchants globally are set up temporarily for the sole purpose of collecting fraudulent payments.

For acquiring banks, tracking, and forecasting financial frauds in payment transactions across merchants is a very challenging task, and more so, with the wide variety of frauds encountered by these acquiring banks. For example, fraudsters may set up ghost merchant accounts (temporary and short-term accounts) with the acquiring banks to collect fraudulent payments from cardholders. In addition, fraudulent merchants may re-route payment transactions through different network codes to circumvent network rules. Further, the fraudulent merchants may operate under a false merchant category to avoid acquirer fees and taxes. Apart from the above-mentioned fraudulent practices, there are many kinds of other risks associated with acquiring banks, including, for example, indulgence in prohibited practices, false claims of a chargeback, and the like. In a nutshell, merchant fraud may place the acquiring banks at risk of chargebacks, fines, regulatory sanctions, and even legal action. There are a few existing acquirer frauds and risk detection solutions in the market. However, the existing solutions perform merchant fraud detection based on simple rule-based methodologies which are unable to provide comprehensive or in-depth information about merchant-related fraud.

In light of the above discussion, there exists a need for a technical solution for fraud and risk management of risks associated with the merchants.

SUMMARY

Various embodiments of the present disclosure provide methods and systems for computing fraud risk scores for various merchants associated with an acquirer server.

In an embodiment, a computer-implemented method for computing fraud risk scores for various merchants associated with an acquirer server is disclosed. The computer-implemented method performed by a server system includes accessing merchant-related transaction data associated with a merchant from a transaction database associated with the server system. Herein, the merchant-related data includes a set of merchant-related transaction indicators. The computer-implemented method further includes generating a set of merchant-related transaction features based, at least in part, on the set of merchant-related indicators. The computer-implemented method further includes generating via one or more risk prediction models, for a payment transaction with the merchant, a set of merchant health and compliance risk scores, a set of merchant terminal risk scores, a set of merchant chargeback risk scores, and a set of merchant activity risk scores based, at least in part, on the set of merchant-related transaction features. Herein, the one or more risk prediction models include a merchant health and compliance risk prediction model, a merchant terminal risk prediction model, a merchant chargeback risk prediction model, and a merchant activity risk prediction model. The computer-implemented method further includes facilitating transmission of a notification message to an acquirer server associated with the merchant. Herein, the notification message includes the set of merchant health and compliance risk scores, the set of merchant terminal risk scores, the set of merchant chargeback risk scores, and the set of merchant activity risk scores.

In another embodiment, a server system is disclosed. The server system includes a communication interface and a memory including executable instructions. The server system also includes a processor communicably coupled to the memory. The processor is configured to execute the instructions to cause the server system, at least in part, to access merchant-related transaction data associated with a merchant from a transaction database associated with the server system. Herein, the merchant-related data includes a set of merchant-related transaction indicators. The server system is further caused to generate a set of merchant-related transaction features based, at least in part, on the set of merchant-related indicators. The server system is further caused to generate via one or more risk prediction models, for a payment transaction with the merchant, a set of merchant health and compliance risk scores, a set of merchant terminal risk scores, a set of merchant chargeback risk scores, and a set of merchant activity risk scores based, at least in part, on the set of merchant-related transaction features. Herein, the one or more risk prediction models include a merchant health and compliance risk prediction model, a merchant terminal risk prediction model, a merchant chargeback risk prediction model, and a merchant activity risk prediction model. The server system is further caused to facilitate transmission of a notification message to an acquirer server associated with the merchant, the notification message comprising the set of merchant health and compliance risk scores, the set of merchant terminal risk scores, the set of merchant chargeback risk scores, and the set of merchant activity risk scores.

In yet another embodiment, a non-transitory computer-readable storage medium is disclosed. The non-transitory computer-readable storage medium includes computer-executable instructions that, when executed by at least a processor of a server system, cause the server system to perform a method. The method includes accessing merchant-related transaction data associated with a merchant from a transaction database associated with the server system. Herein, the merchant-related data includes a set of merchant-related transaction indicators. The method further includes generating a set of merchant-related transaction features based, at least in part, on the set of merchant-related indicators. The method further includes generating via one or more risk prediction models, for a payment transaction with the merchant, a set of merchant health and compliance risk scores, a set of merchant terminal risk scores, a set of merchant chargeback risk scores, and a set of merchant activity risk scores based, at least in part, on the set of merchant-related transaction features. Herein, the one or more risk prediction models include a merchant health and compliance risk prediction model, a merchant terminal risk prediction model, a merchant chargeback risk prediction model, and a merchant activity risk prediction model. The method further includes facilitating transmission of a notification message to an acquirer server associated with the merchant. Herein, the notification message includes the set of merchant health and compliance risk scores, the set of merchant terminal risk scores, the set of merchant chargeback risk scores, and the set of merchant activity risk scores.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

For a more complete understanding of example embodiments of the present technology, reference is now made to the following descriptions taken in connection with the accompanying drawings in which.

Figure 1:
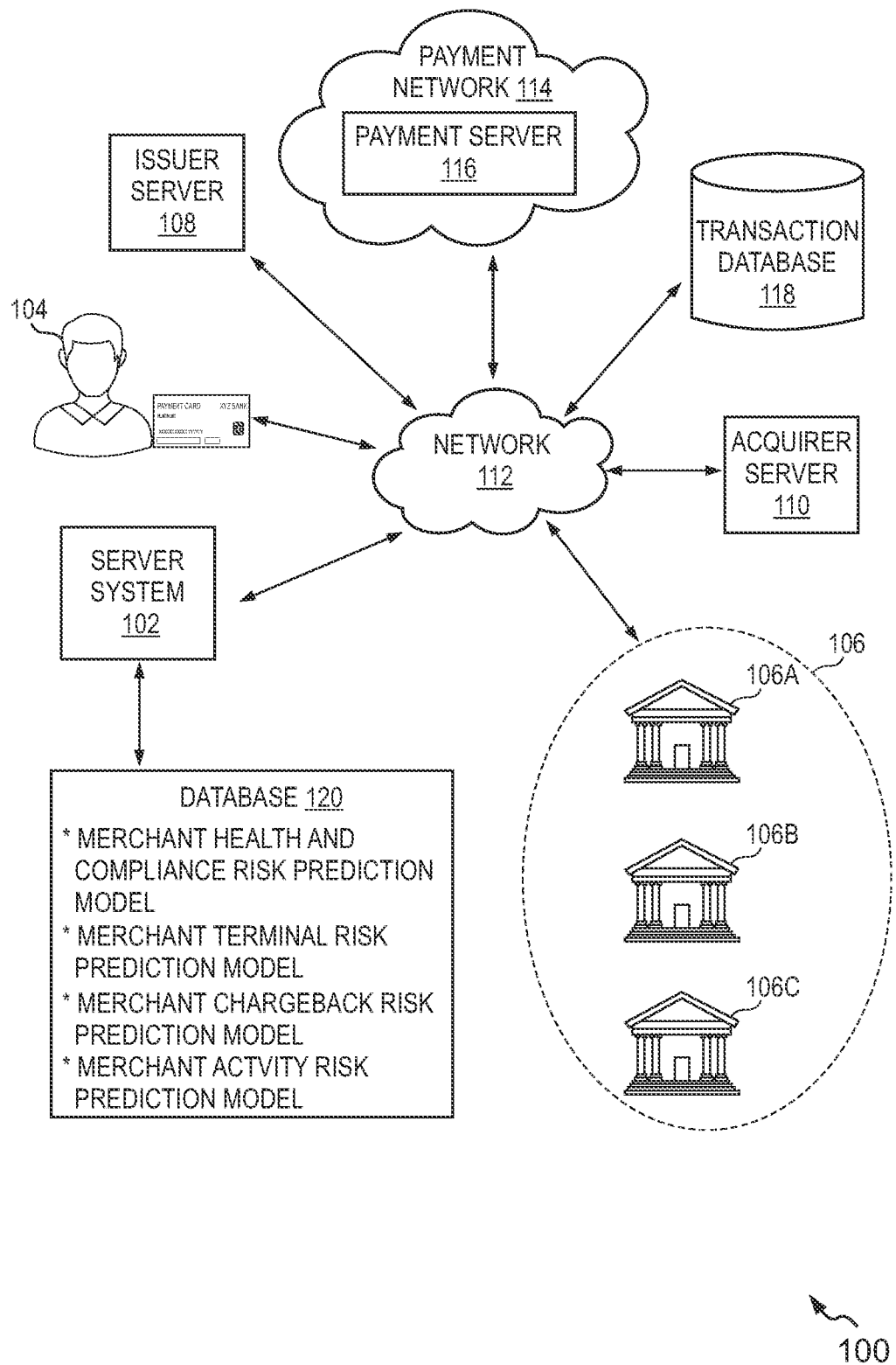
FIG. 1 illustrates an exemplary representation of an environment related to at least some embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification does not necessarily refer to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Embodiments of the present disclosure may be embodied as an apparatus, system, method, or computer program product. Accordingly, embodiments of the present disclosure may take the form of an entirely hardware embodiment, an entirely software embodiment (including firmware, resident software, micro-code, etc.), or an embodiment combining software and hardware aspects that may all generally be referred to herein as a "circuit", "engine", "module", or "system". Furthermore, aspects of the present disclosure may take the form of a computer program product embodied in one or more computer-readable storage media having computer-readable program code embodied thereon.

The term "payment account" used throughout the description refers to a financial account that is used to fund a financial transaction. Examples of financial accounts include, but are not limited to, a savings account, a credit account, a checking account, and a virtual payment account. The financial account may be associated with an entity such as an individual person, a family, a commercial entity, a company, a corporation, a government entity, a non-profit organization, and the like. In some scenarios, a financial account may be a virtual or temporary payment account that can be mapped or linked to a primary financial account, such as those accounts managed by payment wallet service providers, and the like.

The term "payment card", used throughout the description, refers to a physical or virtual card linked with a financial or payment account that may be presented to a merchant or any such facility to fund a financial transaction via the associated payment account. Examples of the payment card include, but are not limited to, debit cards, credit cards, prepaid cards, virtual payment numbers, virtual card numbers, forex cards, charge cards, e-wallet cards, and stored-value cards. A payment card may be a physical card that may be presented to the merchant for funding the payment. Alternatively, or additionally, the payment card may be embodied in the form of data stored in a user device, where the data is associated with a payment account such that the data can be used to process the financial transaction between the payment account and a merchant's financial account.

The term "payment network", used herein, refers to a network or collection of systems used for the transfer of funds through the use of cash-substitutes. Payment networks may use a variety of different protocols and procedures to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by such as Mastercard® and the like.

The term "merchant", used throughout the description generally refers to a seller, a retailer, a purchase location, an organization, or any other entity that is in the business of selling goods or providing services, and it can refer to either a single business location or a chain of business locations of the same entity.

The terms "cardholder", "user", "buyer", and "consumer" are used interchangeably throughout the description and may refer to a person who holds a payment card issued by the issuer bank (such as a credit or a debit card) that can be used by a merchant to perform a payment transaction.

The term "chargeback", used throughout the description, generally refers to the return of a financial amount back to a payment account of a buyer (e.g., cardholder). In general, the chargeback is initiated based on a chargeback request raised by the cardholder with an issuing bank that manages the payment account of the cardholder. For example, when a payment transaction occurs, the cardholder generally has a time period of about 60 to 180 days, during which the cardholder can dispute the payment transaction with its issuing bank.

In addition, the chargeback is initiated when the cardholder wants the issuing bank to remove the charge from its payment account and return the charge to its payment account. Generally, chargebacks are requested in case of fraud. For example, if a merchant deducts a payment amount from the cardholder's account without the consent of the cardholder, then the cardholder may raise a chargeback request with the issuing bank.

Overview

As described earlier, merchant fraud is a wide spread problem that leads to tremendous financial losses for cardholders or consumers each year. Therefore, it is crucial for acquiring banks to track, and forecast financial frauds in payment transactions across merchants. This in itself is a complex task, and more so, with the wide variety of frauds encountered by these acquiring banks, the process becomes even more complicated. In various jurisdictions, regulators or payment processors may hold the acquiring banks liable for chargebacks, fines, regulatory sanctions, and even legal action. Although, there are a few existing acquirer frauds and risk detection solutions in the market. However, the existing solutions perform merchant fraud detection based on simple rule-based methodologies which are unable to provide comprehensive or in-depth information about merchant-related fraud. To that end, an approach is required to address this problem.

In an embodiment, a server system that may be a payment server associated with a payment network is configured to receive an authentication request message for the payment transaction between a cardholder and a merchant from an acquirer server and access merchant-related transaction data associated with the merchant from a transaction database associated with the server system. In an example, the merchant-related data includes a set of merchant-related transaction indicators. In a non-limiting example, the set of merchant-related indicators comprises a unique merchant identifier (ID), geo-location data, a payment means, timestamp information, a merchant industry, a merchant country, a merchant state, a merchant city, a merchant location ID, a transaction amount, a fraud transaction amount, a fraud count indicator, a transaction indicator, transaction currency, an acquiring bank, an acquiring country, an issuing bank, an issuing country, a card product type, an electronic commerce (e-commerce) indicator, a contactless payment indicator, a recurring transaction indicator, a user presence indicator, a cross-border transaction indicator, an average card visit indicator, an average card spend indicator, an average online transaction amount indicator, an average Point of Sale (POS) transaction amount indicator, an average cross-border transaction amount indicator, an average contactless transaction amount indicator, an average Personal Identification Number (PIN) transaction amount indicator, an average card present transaction amount indicator, an average transaction amount on card type indicator, a transaction amount ratio indicator, a card decline rate indicator, a fraud-related chargeback indicator, a non-fraud related chargeback indicator, a Merchant Category Code (MCC) risk indicator, a terminal data indicator, a fallback transaction indicator, and the like.

In another embodiment, the server system is configured to generate a set of merchant-related transaction features based, at least in part, on the set of merchant-related indicators. In another embodiment, the server system is configured to generate via one or more risk prediction models, for a payment transaction with the merchant, a set of merchant health and compliance risk scores, a set of merchant terminal risk scores, a set of merchant chargeback risk scores, and a set of merchant activity risk scores based, at least in part, on the set of merchant-related transaction features. In a non-limiting example, the one or more risk prediction models include a merchant health and compliance risk prediction model, a merchant terminal risk prediction model, a merchant chargeback risk prediction model, a merchant activity risk prediction model, and the like.

In a non-limiting implementation, to generate the set of merchant health and compliance risk scores, the server system is configured to determine a set of health and compliance-related transaction features based, at least in part, on the set of merchant-related transaction features. Herein, the set of health and compliance-related transaction features includes at least merchant fraud risk data, ghost merchant risk data, merchant fraud attrition risk data, merchant circumvention risk data, merchant alternative identity data, and merchant account takeover risk data. Thereafter, the server system is configured to generate via the merchant health and compliance risk prediction model, the set of merchant health and compliance risk scores based, at least in part, on the set of health and compliance-related transaction features. Herein, the set of merchant health and compliance risk scores includes at least a merchant fraud risk score, a ghost merchant risk score, a merchant fraud attrition risk score, a merchant circumvention risk score, a merchant alternative identity score, and a merchant account takeover risk score.

In another non-limiting implementation, to generate the set of merchant terminal risk scores, the server system is configured to determine a set of terminal-related transaction features based, at least in part, on the set of merchant-related transaction features. Herein the set of terminal-related transaction features includes at least chip failure data, terminal fraud attack risk data, and terminal information compromise data. Thereafter, the server system is configured to generate via the merchant terminal risk prediction model, the set of merchant terminal risk scores based, at least in part, on the set of terminal-related transaction features. Herein, the set of merchant terminal risk scores includes at least a chip failure risk score, a terminal fraud attack risk score, and a terminal information compromise score.

In another non-limiting implementation, to generate the set of merchant chargeback risk scores, the server system is configured to determine a set of chargeback-related transaction features based, at least in part, on the set of merchant-related transaction features. Herein, the set of chargeback-related transaction features includes at least fraud chargeback risk data, fraud chargeback Gross Dollar Value (GDV) data, and excessive return risk data. Thereafter, the server system is configured to generate via the merchant chargeback risk prediction model, the set of merchant chargeback risk scores based, at least in part, on the set of terminal-related transaction features. Herein, the set of merchant chargeback risk prediction scores includes at least a fraud chargeback risk score, a fraud chargeback GDV risk score, and an excessive return risk score.

In another implementation, to generate the set of merchant activity risk scores the server system is configured to determine a set of activity related transaction features based, at least in part, on the set of merchant-related transaction features. Herein, set of merchant activity risk scores includes at least contactless adoption likelihood data, contactless adoption revenue data, contactless growth likelihood data, contactless growth revenue data, anomalous ticket risk data, anomalous time risk data, and anomalous sales risk data. Thereafter, the server system is configured to generate via the merchant activity risk prediction model, the set of merchant activity risk scores based, at least in part, on the set of terminal-related transaction features. Herein, the set of merchant activity risk scores includes at least a fraud contactless adoption likelihood score, a contactless adoption revenue score, a contactless growth likelihood score, a contactless growth revenue score, an anomalous ticket risk score, an anomalous time risk score, and an anomalous sales risk score.

In another embodiment, the server system is configured to facilitate transmission of a notification message to the acquirer server associated with the merchant. In an instance, the notification message includes the set of merchant health and compliance risk scores, the set of merchant terminal risk scores, the set of merchant chargeback risk scores, and the set of merchant activity risk scores. In an instance, the server system is configured to generate an updated authorization response message for the payment transaction based, at least in part, on an authorization response message associated with the payment transaction. Herein, the updated authorization response message includes at least the set of merchant health and compliance risk scores, the set of merchant terminal risk scores, the set of merchant chargeback risk scores, and the set of merchant activity risk scores. In a non-limiting implementation, the notification message can be transmitted to the acquirer server via an Application Programming Interface (API) of an application associated with the acquirer server.

Various embodiments of the present disclosure provide multiple advantages and technical effects while addressing technical problems such as how to do fraud and risk management for acquirers. To that end, the various embodiments of the present disclosure provide an approach for computing fraud risk scores for various merchants associated with an acquirer server. The present disclosure describes various machine-learning based risk models that are configured to compute the various fraud risk scores for the merchants. These fraud risk scores then facilitate the acquirer server in identifying vulnerable or fraudulent merchants. The present disclosure provides various artificial intelligence/machine learning scores (i.e., fraud risk scores) that can be delivered through authorization and available via the application programming interface (API). The fraud risk scores can also augment existing acquirer fraud and risk models.

Various embodiments of the present disclosure are described hereinafter with reference to FIGS. 1 to 9.

FIG. 1 illustrates an exemplary representation of an environment 100 related to at least some embodiments of the present disclosure. Although the environment 100 is presented in one arrangement, other embodiments may include the parts of the environment 100 (or other parts) arranged otherwise depending on, for example, computing various risk scores associated with one or more merchants associated with an acquirer, etc. The environment 100 generally includes a plurality of entities, for example, a server system 102, a cardholder 104, a plurality of merchants 106A, 106B, and 106C (hereinafter collectively referred to as merchants 106), an issuer server 108, an acquirer server 110, a payment network 114 including a payment server 116, and a transaction database 118, each coupled to, and in communication with (and/or with access to) a network 112. The network 112 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among the entities illustrated in FIG. 1, or any combination thereof.

Various entities in the environment 100 may connect to the network 112 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof. For example, the network 112 may include multiple different networks, such as a private network made accessible by the payment network 114 to the server system 102, the issuer server 108, the acquirer server 110, and the payment server, separately, and a public network (e.g., the Internet, etc.).

The cardholder 104 may refer to an individual, a representative of a corporate entity, a non-profit organization, or any other person. In one example, the cardholder 104 may use an electronic device (not shown in figures) to perform payment transactions at the merchants 106. In some non-limiting examples, the electronic device may include a smartphone, a tablet computer, a handheld computer, a wearable device, a portable media player, a gaming device, a personal digital assistant (PDA), and the like.

In an example, the cardholder 104 may utilize the electronic device to perform the payment transactions at the merchants 106. In another example, the cardholder 104 may transact at merchant terminals to perform the payment transactions for the merchants 106. Examples of merchant terminals include Point-Of-Sale (POS) devices, Point-Of-Purchase (POP) devices, Point-Of-Interaction (POI) devices, and the like.

In one implementation, the issuer server 108 is a financial institution that manages cardholder accounts (i.e., payment accounts) of multiple cardholders. Payment account details of the payment accounts established with the issuer server 108 are stored in cardholder profiles of the cardholder 104 in memory of the issuer server 108 or on a cloud server associated with the issuer server 108. The issuer server 108 approves or denies a payment authorization request, and then routes, via the payment network 114 (or the server system 102), a payment authorization response back to the acquirer server 110. The acquirer server 110 sends the approval to the merchant (e.g., the merchants 106).

The acquirer server 110 is associated with a financial institution (e.g., a bank) that processes financial transactions. This can be an institution that facilitates the processing of payment transactions for physical stores, ATM terminals, the merchants 106, or an institution that owns platforms that make online purchases or purchases made via software applications possible (e.g., shopping cart platform providers and in-app payment processing providers). The terms "acquirer", "acquirer bank", "acquiring bank" or "acquirer server" will be used interchangeably herein.

In one embodiment, the transaction database 118 stores information on historical payment transactions performed by the cardholder 104 at the merchants 106. For example, the transaction database 118 may store authorization, clearing, and chargeback data of the merchants 106. The transaction database 118 may store historical transaction data including the chargeback data associated with the primary account number (PAN) of the merchants 106.

As discussed above, the acquirer server may have to deal with merchant fraud. In an example, the cardholder 104 may use a payment card to conduct a payment transaction at a POS terminal. The payment account may get debited from the payment account of the cardholder 104 but the cardholder 104 may not receive the expected goods and/or services in return. In this case, the cardholder 104 may raise a chargeback request, and the acquirer server being liable for this fraudulent transaction has to provide the chargeback amount to the cardholder 104, thereby leading to financial damages.

In another example, the merchant 106B may set up its account with the acquirer server under an incorrect merchant category code (e.g., the merchant 106B may register as a grocery store with lower payment processing fees) instead of the real merchant category code (e.g., the merchant 106B may be a liquor store that generally has higher payment processing fees). In such scenarios, the fraudulent merchant 106B may intend to avoid paying increased processing fees and in some cases, taxes as well. Such activities lead to financial losses for the acquirer server and may attract legal liability from regulatory authorities as well. Therefore, merchant-related fraudulent activities can cause tremendous financial damage and pose a serious risk to the smooth operation of the payment ecosystem.

To overcome the above-mentioned and other possible limitations, the present disclosure provides the server system 102. In one non-limiting example, the server system 102 is the payment server. The server system 102 is configured to compute one or more risk scores for the merchants 106 associated with the acquirer server based, at least in part, on one or more fraud risk models.

To that end, the server system 102 is configured to perform one or more of the operations described herein. The server system 102 is configured to determine the one or more risk scores associated with the merchants 106 based, at least in part, on the one or more fraud risk models. The one or more fraud risk models may use merchant-related transaction features as input. The merchant-related transaction features may include health and compliance-related transaction features, terminal-related transaction features, chargeback-related transaction features, activity related transaction features, and other related transaction features. The one or more fraud risk models may include, but are not limited to, a merchant health and compliance risk prediction model, a merchant terminal risk prediction model, a merchant chargeback risk prediction model, a merchant activity risk prediction model, and the like.

In one implementation, the server system 102 is in communication with the acquirer server 110 or the payment server. In addition, the server system 102 is configured to compute the one or more risk scores based on the one or more fraud risk models. The one or more risk scores may then be transmitted to the acquirer server 110. The one or more risk scores may be transmitted via an authorization response message. In an example, the one or more risk scores may be transmitted via an authorization response message as 0110 Message, DE 48 SF55, where DE stands for data element and SF stands for sub-field. Upon receiving the one or more risk scores, the acquirer server 110 may determine whether a merchant (such as the merchant 106A) is engaged in fraudulent behavior. In this manner, the one or more risk scores supplement the judgment of the acquirer server 110 and reduce the overall risk and liability.

In one implementation, the database 120 provides the storage location to the one or more fraud risk models. The database 120 may be incorporated in the server system 102 or may be an individual entity connected to the server system 102 or may be a database stored in cloud storage. In an embodiment, the server system 102 can be a separate part of the environment 100 and may operate as a separate component from (but still in communication with, for example, via the network 112) the acquirer server 110, the payment server, the issuer server 108, and any third-party external servers (to access data to perform the various operations described herein). However, in other embodiments, the server system 102 may be incorporated, in whole or in part, into one or more parts of the environment 100, for example, the payment server. In addition, the server system 102 should be understood to be embodied in at least one computing device in communication with the network 112, which may be specifically configured, via executable instructions, to perform functions as described herein, and/or embodied in at least one non-transitory computer-readable media.

In one embodiment, the payment network 114 may be used by the payment card issuing authorities as a payment interchange network. The payment network 114 may include a plurality of payment servers such as the payment server. Examples of payment interchange networks include, but are not limited to, Mastercard® payment system interchange network. The Mastercard® payment system interchange network is a proprietary communications standard promulgated by Mastercard International Incorporated® for the exchange of financial transactions among a plurality of financial activities that are members of Mastercard International Incorporated®. (Mastercard is a registered trademark of Mastercard International Incorporated located in Purchase, N.Y.).

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device as shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 2:
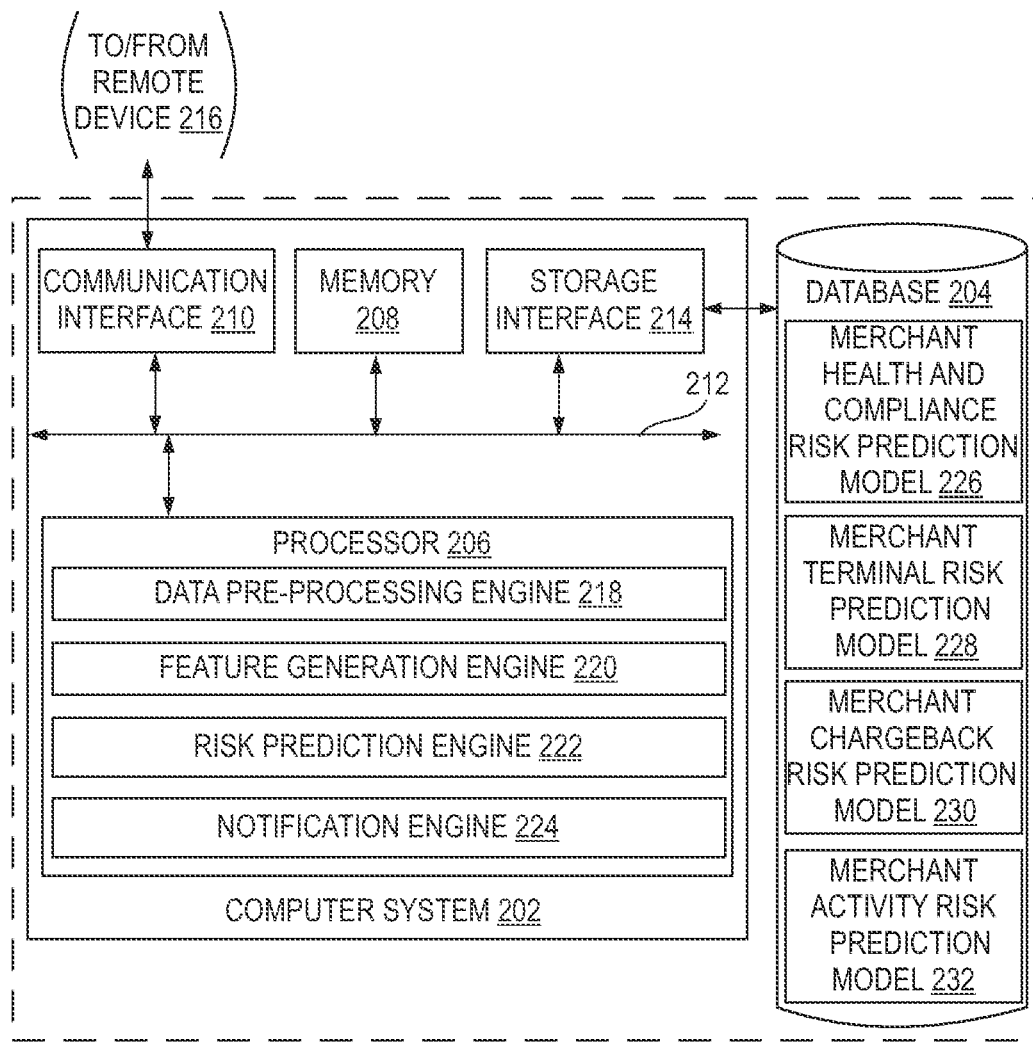
FIG. 2 illustrates a simplified block diagram of a server system, in accordance with an embodiment of the present disclosure.

FIG. 2 illustrates a simplified block diagram of a server system 200, in accordance with an embodiment of the present disclosure. The server system 200 is identical to the server system 102 of FIG. 1. In some embodiments, the server system 200 is embodied as a cloud-based and/or SaaS-based (software as a service) architecture.

The server system 200 includes a computer system 202 and a database 204. The computer system 202 includes at least one processor 206 for executing instructions, a memory 208, a communication interface 210, and a storage interface 214 that communicate with each other via a bus 212. In some embodiments, the database 204 is integrated into the computer system 202. For example, the computer system 202 may include one or more hard disk drives as the database 204. The storage interface 214 is any component capable of providing the processor 206 with access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204. In some embodiments, the database 204 is configured to store a merchant health and compliance risk prediction model 226, a merchant terminal risk prediction model 228, a merchant chargeback risk prediction model 230, and a merchant activity risk prediction model 232.

Examples of the processor 206 include, but are not limited to, an application-specific integrated circuit (ASIC) processor, a reduced instruction set computing (RISC) processor, a complex instruction set computing (CISC) processor, a graphical processing unit (GPU), a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the server system 200, as described herein. In another embodiment, the memory 208 may be realized in the form of a database server or cloud storage working in conjunction with the server system 200, without departing from the scope of the present disclosure.

The processor 206 is operatively coupled to the communication interface 210 such that the processor 206 is capable of communicating with a remote device 216 such as the payment server 116, the acquirer server 110, the issuer server 108, or communicating with any entity connected to the network 112 (as shown in FIG. 1). In one embodiment, the processor 206 is configured to access payment transaction data associated with the merchants 106 from the transaction database 118. It is noted that for the sake of simplicity, it is assumed that the cardholder 104 is performing the payment transaction with the merchant 106A.

It is to be noted that the server system 200 as illustrated and hereinafter described is merely illustrative of an apparatus that could benefit from embodiments of the present disclosure and, therefore, should not be taken to limit the scope of the present disclosure. It is to be noted that the server system 200 may include fewer or more components than those depicted in FIG. 2.

In one embodiment, the processor 206 includes a data pre-processing engine 218, a feature generation engine 220, a risk prediction engine 222, and a notification engine 224.

It should be noted that components, described herein, such as the data pre-processing engine 218, the feature generation engine 220, the risk prediction engine 222, and the notification engine 224 can be configured in a variety of ways, including electronic circuitries, digital arithmetic and logic blocks, and memory systems in combination with software, firmware, and embedded technologies.

In an embodiment, the data pre-processing engine 218 includes suitable logic and/or interfaces for accessing merchant-related transaction data associated with the merchants 106 from the transaction database 118. In particular, the data pre-processing engine 218 may query the transaction database 118 for past transactions of the merchants 106 based on merchant identifiers (IDs) of the merchants 106. In an example, merchant-related transaction data may include at least the payment transaction data of the merchants 106. In one embodiment, the data pre-processing engine 218 may obtain the merchant-related transaction data associated with the merchants 106 from an internal database of the acquirer server 110 (not shown for brevity). In one example, the merchant-related transaction data may include past payment transactions performed at the merchants 106 within a pre-determined time period. In an example, the pre-determined time period may include 3 months, 6 months, 1 year, and the like.

In one implementation, the merchant-related transaction data may be set by the acquirer server 110 based on the internal risk assessment policy of the acquirer bank. It should be noted that the duration of the predetermined time period is related to the accuracy of risk prediction by the one or more fraud risk models of the present disclosure. That is, a risk prediction model operating on merchant-related transaction data of transactions within a duration of 1 year will predict risk scores with higher accuracy than the same model operating on merchant-related transaction data of transactions within a duration of 6 months.

In an embodiment, the merchant-related transaction data may include a set of merchant transaction indicators corresponding to the past payment transactions performed by various cardholders at the merchants 106. The set of merchant transaction indicators includes, but is not limited to, unique merchant identifier, geo-location data, payment means, timestamp information, merchant industry, merchant country, merchant state, merchant city, merchant location ID, transaction amount (or ticket size), fraud transaction amount, fraud count indicator, transaction indicator, transaction currency, acquiring bank, acquiring country, issuing bank, issuing country, card product type, e-commerce indicator, contactless payment indicator, recurring transaction indicator, user presence indicator, cross-border transaction indicator, average card visit indicator, average card spend indicator, average online transaction amount indicator, average POS transaction amount indicator, average cross-border transaction amount indicator, average contactless (such as PayPass) transaction amount indicator, average PIN transaction amount indicator, average card present transaction amount indicator, average transaction amount on card type indicator, transaction amount ratio indicator, card decline rate indicator, fraud-related chargeback indicator, non-fraud related chargeback indicator, MCC risk indicator, terminal data indicators, fallback transaction indicator, and the like.

In some implementations, the data pre-processing engine 218 is configured to perform operations (such as data-cleaning, normalization, feature extraction, and the like) on the set of merchant transaction indicators. The data pre-processing engine 218 is configured to transmit the merchant-related transaction data with the feature generation engine 220.

The feature generation engine 220 includes suitable logic and/or interfaces for generating a set of merchant-related transaction features based on the merchant-related transaction data of the merchants 106. The set of merchant-related transaction features or derived data may include at least health and compliance-related transaction features, terminal-related transaction features, chargeback-related transaction features, and activity-related transaction features. In an embodiment, the set of merchant-related transaction features is determined based, at least, on the set of merchant transaction indicators. In one example, the feature generation engine 220 may include a machine learning model such as, but not limited to, Linear Discriminant Analysis (LDA) model, Independent Component Analysis (ICA) model, or Principal Component Analysis (PCA) model to generate the merchant related transaction features.

In an example, the health and compliance-related transaction features describe the overall health of the merchants 106 and their compliance with the rules implemented by the acquirer server 110 or the payment network 114 in the payment ecosystem. In an example, the health and compliance-related transaction features may include merchant fraud risk data, ghost merchant risk data, merchant fraud attrition risk data, merchant circumvention risk data, merchant alternative identity data, and merchant account takeover risk data. In an embodiment, the various data fields of the health and compliance-related transaction features are derived from one or more data elements of the set of merchant transaction indicators. The health and compliance-related transaction features are explained hereinafter in detail with reference to FIG. 3.

In an example, the terminal-related transaction features describe the state (e.g., damaged, or operational) of the merchant terminal of the merchants 106 during a payment transaction with the cardholder 104. In an embodiment, the terminal-related transaction features may include EMV chip failure data (here, EMV stands for Europay, Mastercard, and Visa), terminal fraud attack risk data, and terminal information compromise data. In an embodiment, the various data fields of the terminal-related transaction features are derived using one or more data elements from the set of merchant transaction indicators. The terminal-related transaction features are explained hereinafter in detail with reference to FIG. 4.

In an example, the chargeback related transaction features describe the likelihood of chargeback for an ongoing payment transaction between the merchant 106A and the cardholder 104. In an embodiment, the chargeback related transaction features may include fraud chargeback risk data, fraud chargeback GDV data, and excessive return risk data. In an embodiment, the various data fields of the chargeback related transaction features are derived using one or more data elements from the set of merchant transaction indicators. The chargeback related transaction features are explained hereinafter in detail with reference to FIG. 5.

In an example, the activity related transaction features describe the activity of the merchant 106A during a predetermined time interval such as 3 months, 6 months, and the like. In one example, the predetermined period may be defined by the acquirer server or an administrator (not shown in figures). In an embodiment, the merchant activity related transaction features may include contactless adoption likelihood data, contactless adoption revenue data, contactless growth likelihood data, contactless growth revenue data, anomalous ticket risk data, anomalous time risk data, and anomalous sales risk data. In an embodiment, the various data fields of the activity related transaction features are derived using one or more data elements from the set of merchant transaction indicators. The activity related transaction features are explained hereinafter in detail with reference to FIG. 6. The set of merchant-related transaction features is then fed as an input to the risk prediction engine 222.

The risk prediction engine 222 includes suitable logic and/or interfaces for determining the one or more risk scores for the merchants 106 engaged in a payment transaction with the cardholder 104. In an embodiment, the one or more risk scores may include at least the set of merchant health and compliance risk scores, merchant terminal risk scores, merchant chargeback risk scores, and merchant activity risk scores.

In particular, the risk prediction engine 222 is configured to compute the one or more risk scores corresponding to the merchants 106 based, at least in part, on the set of merchant related transaction features. More specifically, the risk prediction engine 222 is configured to run or implement one or more AI-based or ML-based fraud risk models to compute the one or more risk scores. In an example, the one or more fraud risk models may include at least the merchant health and compliance risk prediction model 226, the merchant terminal risk prediction model 228, the merchant chargeback risk prediction model 230, and the merchant activity risk prediction model 232.

It is noted that each risk score uniquely indicates the risk of fraud associated with the merchant 106A during the payment transaction. In an example, each risk score from the set of merchant health and compliance risk scores, merchant terminal risk scores, and merchant chargeback risk scores indicates the real-time fraud risk associated with the merchant 106A. In another example, each risk score from the set of merchant activity scores indicates the fraud risk associated with the merchant 106A over the predetermined time interval. In one embodiment, the risk prediction engine 222 is configured to initially train the one or more fraud risk models based, at least in part, on the merchant related transaction features. The risk prediction engine 222 is further configured to transmit the one or more risk scores with the notification engine 224.

The notification engine 224 includes suitable logic and/or interfaces for transmitting a notification message to the acquirer server 110 associated with the merchant 106A. The notification message may include the one or more risk scores. Based on the notification, the acquirer server 110 may perform an internal risk assessment to determine whether to approve or decline the payment transaction. In one implementation, the notification engine 224 may alter the payment authorization response message to transmit the one or more risk scores to the acquirer server 110. In other words, the notification engine 224 is configured to generate an updated payment authorization response message (or updated authorization response message) for the payment transaction based, at least in part, on an authorization response message associated with the payment transaction. The updated authorization response message may include the one or more risk scores.

The notification engine 224 can transmit the one or more risk scores to the acquirer server 110 in real-time. In an implementation, the notification engine 224 may transmit the one or more risk scores via an API of an acquirer application associated with the acquirer server 110. In an example, the API of the acquirer application may be set up by the notification engine 224 to transmit the one or more risk scores to the acquirer server 110 at different predetermined time intervals. The API may include a set of executable instructions for communicably coupling the server system 200 with the acquirer server 110. The notification engine 224 may generate notification messages to be shared with the acquirer server 110 through the API. In one example, the notification message may include at least the one or more risk scores computed by the risk prediction engine 222.

Figure 3:
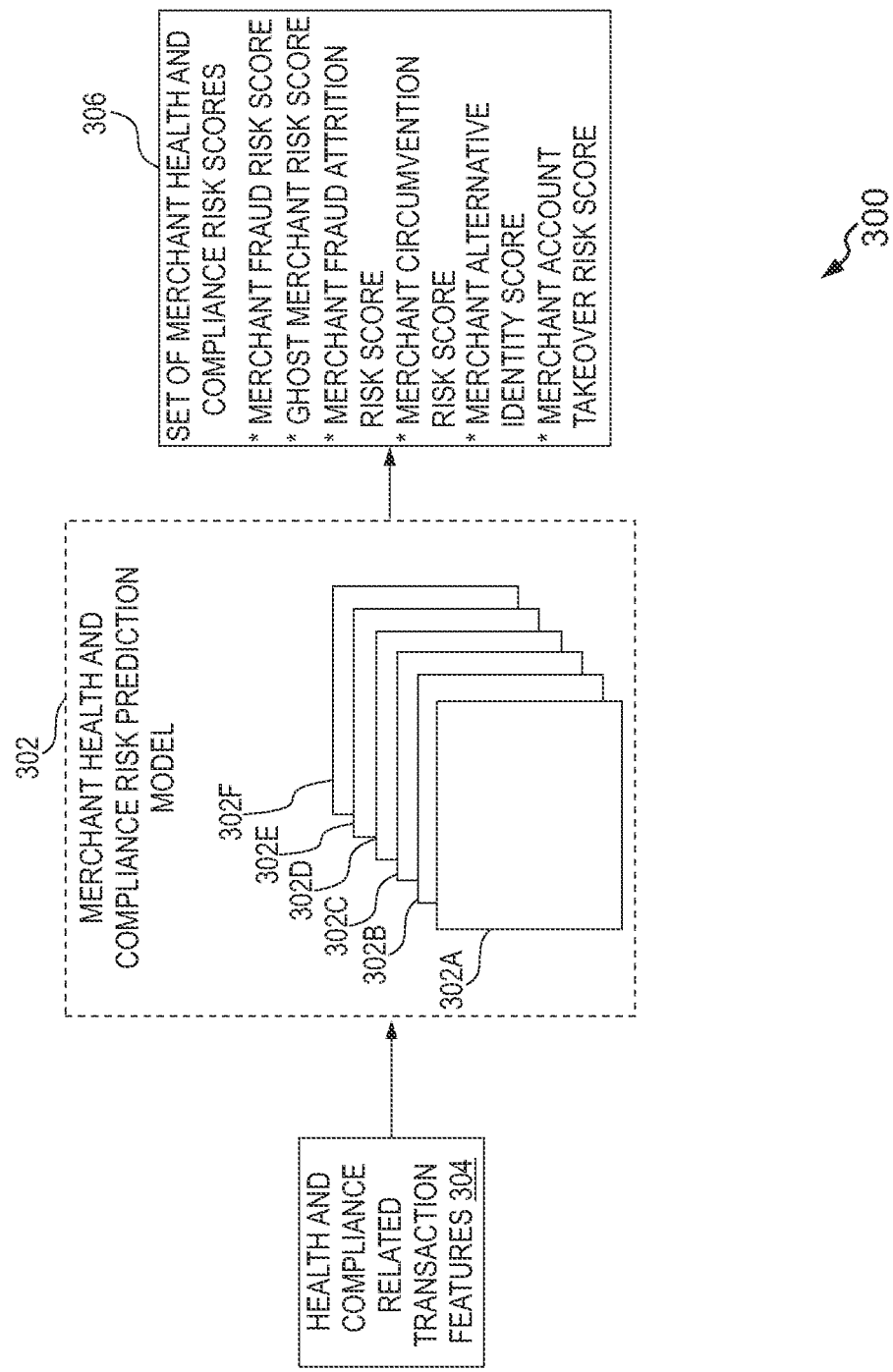
FIG. 3 illustrates a simplified block diagram representation for predicting a set of merchant health and compliance risk scores for the merchants, in accordance with an embodiment of the present disclosure.

FIG. 3 illustrates a simplified block diagram representation 300 for predicting a set of merchant health and compliance risk scores 306 for the merchants 106, in accordance with an embodiment of the present disclosure.

The merchant health and compliance risk prediction model 302 is configured to compute health and compliance risk scores for a payment transaction that is ongoing between the merchant 106A and the cardholder 104. The merchant health and compliance risk prediction model 302 predicts risk scores associated with the merchant 106A. In various non-limiting examples, the merchant health and compliance risk prediction model 302 includes one or more machine learning models (see, 302A, 302B, 302C, 302D, 302F, and 302F) for determining the set of health and compliance risk scores for cardholders of the issuer server. In an embodiment, the merchant health and compliance risk prediction model 302 is trained using a plurality of historical merchant-related transaction data.

In an embodiment, the merchant health and compliance risk prediction model 302 computes the set of merchant health and compliance risk scores 306 that are indicative of the probability percentage values of the merchant 106A being a fraudster and violating compliance rules. In an embodiment, the set of merchant health and compliance risk scores 306 may include at least merchant fraud risk score, ghost merchant risk score, merchant fraud attrition risk score, merchant circumvention risk score, merchant alternative identity score, and merchant account takeover risk score. In an embodiment, the set of merchant health and compliance risk scores 306 is determined by the merchant health and compliance risk prediction model 302 based on the health and compliance-related transaction features 304 generated by the feature determining engine. To that end, it should be understood that the set of merchant health and compliance risk scores 306 is determined based, at least in part, on merchant fraud risk data, ghost merchant risk data, merchant fraud attrition risk data, merchant circumvention risk data, merchant alternative identity data, and merchant account take over risk data.

In an example, a merchant fraud risk score indicates that the merchant 106A is engaging in some suspicious activity as a portion of the overall business. The merchant health and compliance risk prediction model 302A determines the merchant fraud risk score based on predicting that the merchant 106A is likely to experience high reported fraudulent transactions in the next few months (for example, 3 months) when compared to their historical average. The merchant fraud risk score enables the acquirer server 110 to re-evaluate business relations with the merchants who are expressly using the payment network to engage in fraudulent activities.

The merchant health and compliance risk prediction model 302A is configured to compute the merchant fraud risk score based at least on the merchant fraud risk data. In a non-limiting example, the merchant fraud risk score may be a numeric value (e.g., a 3-digit value between 000-999) that is indicative of the likelihood of a merchant 106A encountering fraudulent activity. It is noted that the numeric value represents the probability percentage of the merchant 106A encountering fraudulent activity. For example, the merchant fraud risk score of 25 represents the probability percentage of the merchant 106A encountering fraudulent activity is 2.5%. Similarly, the merchant fraud risk score of 999 represents that the probability percentage is 99.9%. It is noted that 000 represents the lowest probability percentage value and 999 represents the highest probability percentage value. In an instance, the merchant fraud risk score is computed via an Extreme gradient boosting (XGBoost) Classifier model along with embeddings generated using the merchant fraud risk data. In a particular instance, the respective embeddings may be generated using a graph based machine learning model on the merchant fraud risk data. In an example, the data elements of the merchant fraud risk data are illustrated in Table 1 below:

TABLE 1

Total fraud cards transacted at the merchant in the last 3 months
Total cards transacted at the merchant in the last 3 months
Merchant category
Merchant industry
Merchant country
Terminal identifier
Merchant identifier
Merchant region
Decline rate in last 1 day, 7 days, 15 days, 1 month, 2 months, and 3 months TABLE 1-continued Fraud rate in last 1 day, 7 days, 15 days, 1 month, 2 months, and 3 months
Merchant score from CPP model
Merchant rank from CPP model
Merchant regional rank from CPP model
Merchant country level rank from CPP model
Channel of the transaction and its interaction
Whether merchant is enabled 3D-secure 2.0
Aggregated DI score for a merchant and its interaction
Weather merchant is flagged by the dark web analysis
Fraud report date of a card In an example, the ghost merchant risk score indicates the likelihood that the merchant 106A is set up temporarily for a short-term to engage in fraudulent transactions. The merchant health and compliance risk prediction model 302B determines the ghost merchant risk score based on predicting that the merchant 106A would engage in fraudulent activities within the next few months (for example, 3 months) that are likely to be greater than the GDV of the total transactions in the same time period. The ghost merchant risk score enables the acquirer server 110 to understand the merchant risk profile for liability shifts and enforcement of higher security standards. The merchant health and compliance risk prediction model 302B is configured to compute the ghost merchant risk score based at least on the ghost merchant risk data. In a non-limiting example, the ghost merchant risk score may be a numeric value (e.g., a 3-digit value between 000-999) that is indicative of the likelihood of the merchant 106A presenting ghost merchant risk. It is noted that the numeric value represents the probability percentage of the merchant 106A encountering fraudulent activity. For example, the ghost merchant risk score of 35 represents the probability percentage of the merchant 106A encountering fraudulent activity is 3.5%. Similarly, the ghost merchant risk score of 899 represents that the probability percentage is 89.9%. It is noted that 000 represents the lowest probability percentage value and 999 represents the highest probability percentage value. In an instance, the ghost merchant risk score is computed via an XGBoost Classifier model using the ghost merchant risk data. In an example, the data elements of the ghost merchant risk data are illustrated in Table 2 below:

TABLE 2

Total declined transactions count in the last 3 months

Total declined transactions average in the last 3 months

Total transaction count where DI score = [0, 700] in the last 1 day, [701, 900] in the last 1 day, [901, 1000] in the last 1 day, [0, 700] in the last 1 week, [701, 900] in the last 1 week, [901, 1000] in the last 1 week, [0, 700] in the last 1 month, [701, 900] in the last 1 month, [901, 1000] in the last 1 month, [0, 700] in the last 3 months, [701, 900] in the last 3 months, [901, 1000] in the last 3 months, Maximum DI score in the last 1 day, 1 week, 1 month, and 3 months Average DI score in the last 1 day, 1 week, 1 month, and 3 months Total fraud transaction count in the last 1 day, 1 week, 1 month, and 3 months Total fraud transaction amount in the last 1 day, 1 week, 1 month, and 3 months Total transaction count in the last 1 day, 1 week, 1 month, and 3 months Total transaction amount in the last 1 day, 1 week, 1 month, and 3 months Days passed since the first transaction date Days passed since the last transaction date In an example, the merchant fraud attrition risk score indicates the likelihood of a high number of fraudulent activities before a period of transaction in-activity from the merchant 106A. The merchant health and compliance risk prediction model 302C determines the merchant fraud attrition risk based on predicting that the merchant 106A is experiencing a significant decrease in transaction activity while at the same time, there is a significant increase in the chargeback in the next few months (for example, 3 months). The merchant fraud attrition risk score enables the acquirer server 110 to understand the fraud liability due to future merchant in-activity risk. The merchant health and compliance risk prediction model 302C is configured to compute the merchant fraud attrition risk score based at least on the merchant fraud attrition risk data. In a non-limiting example, the merchant fraud attrition risk score may be a numeric value (e.g., a 3-digit value between 000-999) that is indicative of the likelihood of the specific merchant to attrite. It is noted that the numeric value represents the probability percentage of the merchant 106A encountering fraudulent activity. For example, the merchant fraud attrition risk score of 45 represents the probability percentage of the merchant 106A encountering fraudulent activity is 4.5%. Similarly, the merchant fraud attrition risk score of 799 represents that the probability percentage is 79.9%. It is noted that 000 represents the lowest probability percentage value and 999 represents the highest probability percentage value. In an instance, the Merchant fraud attrition risk score is computed via an XGBoost Classifier model along with embeddings generated using the merchant fraud attrition risk data. In a particular instance, the respective embeddings may be generated using a graph based machine learning model using the merchant fraud attrition risk data. In an example, the data elements of the merchant fraud attrition risk data are illustrated in Table 3 below:

TABLE 3

Acquirer region code
Acquirer country code
Merchant country code
Information about if merchant category code (MCC) is risky or not
Total transaction count where DI score = [0, 700] in the last 1 day, 1 week, 90 days, and 180 days
Total transaction count where DI score = [701, 900] in the last 1 day, 1 week, 90 days, and 180 days
Total transaction count where DI score = [901, 1000] in the last 1 day, 1 week, 90 days, and 180 days
Total transaction amount where DI score = [0, 700] in the last 1 day, 1 week, 90 days, and 180 days
Total transaction amount where DI score = [701, 900] in the last 1 day, 1 week, 90 days, and 180 days
Total transaction amount where DI score = [901, 1000] in the last 1 day, 1 week, 90 days, and 180 days
The highest DI score on all transactions in the last 1 day, 1 week, 90 days, and 180 days
The lowest DI score on all transactions in the last 1 day, 1 week, 90 days, and 180 days
Total transaction amount in the last 1 day, 1 week, 90 days, and 180 days
Total transaction count in the last 1 day, 1 week, 90 days, and 180 days
Total approved amount in the last 1 day, 1 week, 90 days, and 180 days
Total approved count in the last 1 day, 1 week, 90 days, and 180 days
Total declined amount in the last 1 day, 1 week, 90 days, and 180 days
Total declined count in the last 1 day, 1 week, 90 days, and 180 days
Total distinct card numbers for approved transactions in the last 1 day, 1 week, 90 days, and 180 days
Total distinct card numbers for declined transactions in the last 1 day, 1 week, 90 days, and 180 days
Total approved transaction amount in domestic transactions in the last 1 day, 1 week, 90 days, and 180 days
Total approved transaction count in domestic transactions in the last 1 day, 1 week, 90 days, and 180 days
Total approved transaction amount in cross-border transactions in the last 1 day, 1 week, 90 days, and 180 days
Total approved transaction count in cross-border transactions in the last 1 day, 1 week, 90 days, and 180 days
Total approved transaction amount in card-present transactions in the last 1 day, 1 week, 90 days, and 180 days
Total approved transaction amount in card not present transactions in the last 1 day, 1 week, 90 days, and 180 days
Total approved transaction count in card-present transactions in the last 1 day, 1 week, 90 days, and 180 days
Total approved transaction count in card not present transactions in the last 1 day, 1 week, 90 days, and 180 days
Total declined transaction amount in domestic transactions in the last 1 day, 1 week, 90 days, and 180 days
Total declined transaction count in domestic transactions in the last 1 day, 1 week, 90 days, and 180 days
Total declined transaction amount in cross-border transactions in the last 1 day, 1 week, 90 days, and 180 days
Total declined transaction count in cross-border transactions in the last 1 day, 1 week, 90 days, and 180 days
Total declined transaction amount in card-present transactions in the last 1 day, 1 week, 90 days, and 180 days
Total declined transaction amount in card not present transactions in the last 1 day, 1 week, 90 days, and 180 days TABLE 3-continued Total declined transaction count in card-present transactions in the last 1 day, 1 week, 90 days, and 180 days
Total declined transaction count in card not present transactions in the last 1 day, 1 week, 90 days, and 180 days
Total approved transaction amount in recurring transactions in the last 1 day, 1 week, 90 days, and 180 days
Total approved transaction amount in e-commerce transactions in the last 1 day, 1 week, 90 days, and 180 days
Total approved transaction count in recurring transactions in the last 1 day, 1 week, 90 days, and 180 days
Total approved transaction count in e-commerce transactions in the last 1 day, 1 week, 90 days, and 180 days
Total declined transaction amount in recurring transactions in the last 1 day, 1 week, 90 days, and 180 days
Total declined transaction amount in e-commerce transactions in the last 1 day, 1 week, 90 days, and 180 days
Total declined transaction count in recurring transactions in the last 1 day, 1 week, 90 days, and 180 days
Total declined transaction count in e-commerce transactions in the last 1 day, 1 week, 90 days, and 180 days
Total approved transaction amount on product type = credit in the last 1 day, 1 week, 90 days, and 180 days
Total approved transaction amount on product type = debit in the last 1 day, 1 week, 90 days, and 180 days
Total approved transaction amount on product type = prepaid in the last 1 day, 1 week, 90 days, and 180 days
Total declined transaction amount on product type = credit in the last 1 day, 1 week, 90 days, and 180 days
Total declined transaction amount on product type = debit in the last 1 day, 1 week, 90 days, and 180 days
Total declined transaction amount on product type = prepaid in the last 1 day, 1 week, 90 days, and 180 days
Total approved transaction count on product type = credit in the last 1 day, 1 week, 90 days, and 180 days
Total approved transaction count on product type = debit in the last 1 day, 1 week, 90 days, and 180 days
Total approved transaction count on product type = prepaid in the last 1 day, 1 week, 90 days, and 180 days
Total declined transaction count on product type = credit in the 1 day, 1 week, 90 days, and 180 days
Total declined transaction count on product type = debit in the 1 day, 1 week, 90 days, and 180 days
Total declined transaction count on product type = prepaid in the 1 day, 1 week, 90 days, and 180 days
Total count of distinct card numbers in the 1 day, 1 week, 90 days, and 180 days
Average decline rate in the 1 day, 1 week, 90 days, and 180 days
Number of transactions less than 10 dollars in the 1 day, 1 week, 90 days, and 180 days
Number of transactions less than 1 dollar in the 1 day, 1 week, 90 days, and 180 days
Number of transactions between $1 and $5, $5 and $10, $15 and $30, $30 and $50, $50 and $100 in the 1 day, 1 week, 90 days, and 180 days
Number of transactions with card verification value (CVV) code 'rm' in the 1 day, 1 week, 90 days, and 180 days
Number of transactions with CVV code 'r_np' in the 1 day, 1 week, 90 days, and 180 days
Number of transactions with CVV code 'r_nm' in the 1 day, 1 week, 90 days, and 180 days
Number of debit transactions with CVV code 'rm' in the 1 day, 1 week, 90 days, and 180 days
Number of debit transactions with CVV code 'r_np' in the 1 day, 1 week, 90 days, and 180 days
Number of debit transactions with CVV code 'r_nm' in the 1 day, 1 week, 90 days, and 180 days
Number of transactions with Address verification service (AVS) code 'm_partial' in the 1 day, 1 week, 90 days, and 180 days
Number of transactions with AVS code 'nm' in the 1 day, 1 week, 90 days, and 180 days
Number of transactions with AVS code 'np' in the 1 day, 1 week, 90 days, and 180 days
Number of transactions with AVS code 'match_req_debit' in the 1 day, 1 week, 90 days, and 180 days
Number of transactions with fraud history decline code in the 1 day, 1 week, 90 days, and 180 days
Number of transactions with lost stolen decline code in the 1 day, 1 week, 90 days, and 180 days
Number of transactions with flagged risky decline code in the 1 day, 1 week, 90 days, and 180 days
Number of transactions with Personal identification number (PIN) based decline code in the 1 day, 1 week, 90 days, and 180 days
Number of transactions with invalid decline code in the 1 day, 1 week, 90 days, and 180 days
Number of transactions with amount_cnt decline code in the 1 day, 1 week, 90 days, and 180 days TABLE 3-continued Number of transactions with restricted decline code in the 1 day, 1 week, 90 days, and 180 days
Number of transactions with generic decline code in the 1 day, 1 week, 90 days, and 180 days
Number of transactions with others decline code in the 1 day, 1 week, 90 days, and 180 days In an example, the merchant circumvention risk score indicates the likelihood of the merchant 106A being involved in the re-routing of payment transactions using different codes to circumvent network rules. The merchant health and compliance risk prediction model 302D determines the merchant circumvention risk score based on predicting that the merchant 106A is exhibiting high fraud basis points w.r.t. the corresponding category benchmark in the past few months (for example, 3 months). The merchant circumvention risk score enables the acquirer server 110 to ensure that the merchant 106A credentials are established for legitimate business purposes. The merchant health and compliance risk prediction model 302D is configured to compute the merchant circumvention risk score based at least on the merchant circumvention risk data. In a non-limiting example, the merchant circumvention risk score may be a numeric value (e.g., a 3-digit value between 000-999) that is indicative of the likelihood of the merchant 106A presenting a circumvention risk. It is noted that the numeric value represents the probability percentage of the merchant 106A encountering fraudulent activity. For example, the merchant circumvention risk score of 45 represents the probability percentage of the merchant 106A encountering fraudulent activity is 4.5%. Similarly, the merchant circumvention risk score of 799 represents that the probability percentage is 79.9%. It is noted that 000 represents the lowest probability percentage value and 999 represents the highest probability percentage value. In an instance, the Merchant circumvention risk score is computed via a decision tree based model along with a set of rules using merchant circumvention risk data. In a particular instance, the respective set of rules may be defined by an administrator of the server system 200.

In an example, the merchant alternative identity risk score indicates the likelihood of the merchant 106A operating under a false category not representative of the actual business of the merchant 106A. The merchant health and compliance risk prediction model 302F determines the merchant alternative identity risk score based on predicting that the merchant category does not match the corresponding industry benchmark based on spending patterns of various cardholders recorded at the merchant 106A. The merchant alternative identity risk score enables the acquirer server 110 to ensure that the merchant credentials are established for legitimate business purposes. The merchant health and compliance risk prediction model 302F is configured to compute the merchant alternative identity risk score based at least on the merchant alternative identity risk data. In a non-limiting example, the merchant alternative identity risk score may be a numeric value (e.g., a 3-digit value between 000-999) that is indicative of the likelihood of the merchant 106A presenting an alternate identity risk. It is noted that the numeric value represents the probability percentage of the merchant 106A encountering fraudulent activity. For example, a merchant alternative identity risk score of 423 represents the probability percentage of the merchant 106A encountering fraudulent activity is 42.3%. Similarly, a merchant alternative identity risk score of 789 represents that the probability percentage is 78.9%. It is noted that 000 represents the lowest probability percentage value and 999 represents the highest probability percentage value. In an instance, the Merchant alternative identity score is computed via an XGBoost Classifier model. In an example, the data elements of the merchant alternative identity risk data are illustrated in Table 4 below:

TABLE 4

Cleaned merchant location identifier (ID) to find the unique number of stores or location of the merchant
Super Industry code
Industry code
Total transaction amount in the last 1 day, 7 days, 14 days, 21 days, 28 days, 30 days, 90 days, and 180 days
Fraud transaction amount in the last 1 day, 7 days, 14 days, 21 days, 28 days, 30 days, 90 days, and 180 days
Average visit per card in the last 1 day, 7 days, 14 days, 21 days, 28 days, 30 days, 90 days, and 180 days
The average amount spent per card in the last 1 day, 7 days, 14 days, 21 days, 28 days, 30 days, 90 days, and 180 days
Average of the total transaction amount in the last 1 day, 7 days, 14 days, 21 days, 28 days, 30 days, 90 days, and 180 days
Average online transaction amount in the last 1 day, 7 days, 14 days, 21 days, 28 days, 30 days, 90 days, and 180 days
Average Point of Sale (POS) transaction amount in the last 1 day, 7 days, 14 days, 21 days, 28 days, 30 days, 90 days, and 180 days
Average crossborder transaction amount in the last 1 day, 7 days, 14 days, 21 days, 28 days, 30 days, 90 days, and 180 days
Average weekday transaction amount in the last 1 day, 7 days, 14 days, 21 days, 28 days, 30 days, 90 days, and 180 days
Average weekend transaction amount in the last 1 day, 7 days, 14 days, 21 days, 28 days, 30 days, 90 days, and 180 days
Average morning transaction amount in the last 1 day, 7 days, 14 days, 21 days, 28 days, 30 days, 90 days, and 180 days
Average afternoon transaction amount in the last 1 day, 7 days, 14 days, 21 days, 28 days, 30 days, 90 days, and 180 days

TABLE 4-continued

Average evening transaction amount in the last 1 day, 7 days, 14 days, 21 days, 28 days, 30 days, 90 days, and 180 days
Average night transaction amount in the last 1 day, 7 days, 14 days, 21 days, 28 days, 30 days, 90 days, and 180 days
Average transaction amount in card-present transactions in the last 1 day, 7 days, 14 days, 21 days, 28 days, 30 days, 90 days, and 180 days
Average transaction amount in pin based transactions in the last 1 day, 7 days, 14 days, 21 days, 28 days, 30 days, 90 days, and 180 days
Average transaction amount in paypass transactions in the last 1 day, 7 days, 14 days, 21 days, 28 days, 30 days, 90 days, and 180 days
Average transaction amount on product type = credit in the last 1 day, 7 days, 14 days, 21 days, 28 days, 30 days, 90 days, and 180 days
Average transaction amount on product type = debit in the last 1 day, 7 days, 14 days, 21 days, 28 days, 30 days, 90 days, and 180 days
Average transaction amount on product type name = corporate in the last 1 day, 7 days, 14 days, 21 days, 28 days, 30 days, 90 days, and 180 days
Ratio of online transaction amount in the last 1 day, 7 days, 14 days, 21 days, 28 days, 30 days, 90 days, and 180 days to total transaction amount in the last 1 day, 7 days, 14 days, 21 days, 28 days, 30 days, 90 days, and 180 days
Ratio of crossborder transaction amount in the last 1 day, 7 days, 14 days, 21 days, 28 days, 30 days, 90 days, and 180 days to total transaction amount in the last 1 day, 7 days, 14 days, 21 days, 28 days, 30 days, 90 days, and 180 days
Ratio of weekday transaction amount in the last 1 day, 7 days, 14 days, 21 days, 28 days, 30 days, 90 days, and 180 days to total transaction amount in the last 1 day, 7 days, 14 days, 21 days, 28 days, 30 days, 90 days, and 180 days
Ratio of weekend transaction amount in the last 1 day, 7 days, 14 days, 21 days, 28 days, 30 days, 90 days, and 180 days to total transaction amount in the last 1 day, 7 days, 14 days, 21 days, 28 days, 30 days, 90 days, and 180 days
Ratio of morning transaction amount in the last 1 day, 7 days, 14 days, 21 days, 28 days, 30 days, 90 days, and 180 days to total transaction amount in the last 1 day, 7 days, 14 days, 21 days, 28 days, 30 days, 90 days, and 180 days
Ratio of afternoon transaction amount in the last 1 day, 7 days, 14 days, 21 days, 28 days, 30 days, 90 days, and 180 days to total transaction amount in the last 1 day, 7 days, 14 days, 21 days, 28 days, 30 days, 90 days, and 180 days
Ratio of evening transaction amount in the last 1 day, 7 days, 14 days, 21 days, 28 days, 30 days, 90 days, and 180 days to total transaction amount in the last 1 day, 7 days, 14 days, 21 days, 28 days, 30 days, 90 days, and 180 days
Ratio of night transaction amount in the last 1 day, 7 days, 14 days, 21 days, 28 days, 30 days, 90 days, and 180 days to total transaction amount in the last 1 day, 7 days, 14 days, 21 days, 28 days, 30 days, 90 days, and 180 days
Ratio of the transaction amount in card-present transactions in the last 1 day, 7 days, 14 days, 21 days, 28 days, 30 days, 90 days, and 180 days to total transaction amount in the last 1 day, 7 days, 14 days, 21 days, 28 days, 30 days, 90 days, and 180 days
Ratio of the transaction amount in pin based transactions in the last 1 day, 7 days, 14 days, 21 days, 28 days, 30 days, 90 days, and 180 days to total transaction amount in the last 1 day, 7 days, 14 days, 21 days, 28 days, 30 days, 90 days, and 180 days
Ratio of the transaction amount in paypass transactions in the last 1 day, 7 days, 14 days, 21 days, 28 days, 30 days, 90 days, and 180 days to total transaction amount in the last 1 day, 7 days, 14 days, 21 days, 28 days, 30 days, 90 days, and 180 days
Ratio of transaction amount on product type = credit in the last 1 day, 7 days, 14 days, 21 days, 28 days, 30 days, 90 days, and 180 days to total transaction amount in the last 1 day, 7 days, 14 days, 21 days, 28 days, 30 days, 90 days, and 180 days
Ratio of transaction amount on product type = debit in the last 1 day, 7 days, 14 days, 21 days, 28 days, 30 days, 90 days, and 180 days to total transaction amount in the last 1 day, 7 days, 14 days, 21 days, 28 days, 30 days, 90 days, and 180 days
Ratio of transaction amount on product type name = corporate in the last 1 day, 7 days, 14 days, 21 days, 28 days, 30 days, 90 days, and 180 days to total transaction amount in the last 1 day, 7 days, 14 days, 21 days, 28 days, 30 days, 90 days, and 180 days In an example, the merchant account takeover risk score is indicative of the likelihood that the payment account of the merchant 106A is being taken over by a fraudster for fraud testing purposes, e.g., testing stolen credit cards. The merchant health and compliance risk prediction model 302F determines the merchant account takeover risk score based on predicting that the merchant 106A is showing a significant increase in low denomination payment transaction decline rates along with an increase in transactions through unique payment cards. The merchant account takeover risk score enables the acquirer server 110 to understand the risk of a specific merchant being breached by fraudsters. The merchant health and compliance risk prediction model 302F is configured to compute the merchant account takeover risk score based at least on the merchant account takeover risk data. In a non-limiting example, the merchant account takeover risk score may be a numeric value (e.g., a 3-digit value between 000-999) where the merchant 106A with takeover risk is the identifier by a risk score of 999 otherwise, the merchant 106A is identified with a risk score of 001. It is noted that 000 represents the lowest probability percentage value and 999 represents the highest probability percentage value. In an instance, the Merchant account takeover risk score is computed via an XGBoost Classifier model along with embeddings generated using the merchant account takeover risk data. In a particular instance, the respective embeddings may be generated using a graph based machine learning model using the merchant account takeover risk data. In an example, the data elements of the merchant account takeover risk data are illustrated in Table 5 below:

TABLE 5

Figure 4:
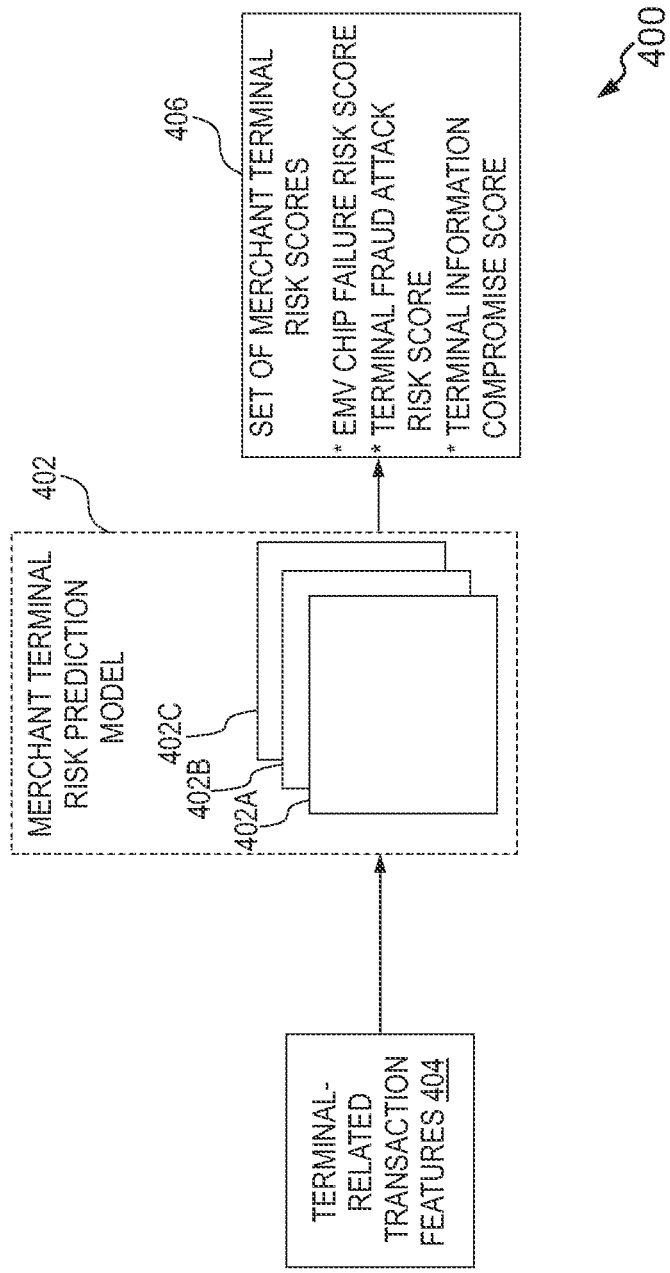
FIG. 4 illustrates a simplified block diagram representation for predicting a set of merchant terminal risk scores for the merchants, in accordance with an embodiment of the present disclosure.

Number of transactions in a day less than $10
The deviation of the daily decline rate compared to the 6 month daily decline rate mean
Number of declined card not present transactions below $10
Number of daily recurring declines below $10
Total daily transaction count
The number of Card not present declines in a day/Number of Card not present approves in a day
Number of approved recurring transactions in a day
Number of declined recurring transactions in a day
The deviation of Card Present Count decline rate from the 6 month daily card not present decline rate average
The deviation of Card Present Count from the 6 month daily card not present decline count average
Number of Card present count declines below $10
Number of Card present declines in a day/Number of Card present approves in a day
Number of transactions in a month
Number of declined transactions in a month
Number of declined transactions in a month/Number of approved transactions in a month
Number of declined Card Not Present transactions in a month
Number of transactions in a month less than $10
Number of approved recurring transactions in a month
Number of declined recurring transactions in a month
Number of declined Card present transactions in a month FIG. 4 illustrates a simplified block diagram representation 400 for predicting a set of merchant terminal risk scores 406 for the merchants 106, in accordance with an embodiment of the present disclosure.

In an embodiment, the merchant terminal risk prediction model 402 is configured to compute the terminal risk scores for a payment transaction that is ongoing between the merchant 106A and the cardholder 104. The merchant terminal risk prediction model 402 predicts risk scores associated with the merchant 106A of the acquirer. The merchant terminal risk prediction model 402 may include one or more machine learning models (see, 402A, 402B, and 402C) for determining the terminal risk score for the merchant 106A of the acquirer. In an embodiment, the merchant terminal risk prediction model 402 is trained using a plurality of historical merchant-related transaction data.

In an embodiment, the merchant terminal risk prediction model 402 computes the set of merchant terminal risk scores 406 that are indicative of the probability values of the merchant 106A operating a faulty or compromised terminal device. In an embodiment, the set of merchant terminal risk scores 406 may include at least EMV chip failure risk score, terminal fraud attack risk score, and terminal information compromise score. The set of merchant terminal risk scores 406 is determined by the model based on the terminal-related transaction features 404 generated by the feature determining engine. To that end, it should be understood that the set of merchant terminal risk scores 406 is determined based, at least in part, on the EMV chip failure data, terminal fraud attack risk data, and terminal information compromise data.

In an example, the EMV chip failure risk score indicates that the terminal used by the merchant 106A has deteriorated and the cardholder 104 might need to swipe their payment card to complete the transaction. In an alternate scenario, the EMV chip failure risk score may also indicate that the EMV chip of the payment card being used by the cardholder 104 has deteriorated. It should be understood that swiping the card instead of using the EMV chip to complete the transaction is inherently less secure and may lead to the card details being stolen. The merchant terminal risk prediction model 402A determines the EMV chip failure risk score based on determining the volume of fallback transactions performed at the terminal, transaction decline rates, and its impact on fraud. The fallback transaction occurs when an EMV chip card is used at an EMV chip-enabled terminal and the chip cannot be read due to a technical issue with the chip or issues with the terminal, thus forcing the cardholder 104 to swipe the card. The EMV chip failure risk score enables the acquirer server 110 to proactively fix terminal issues to prevent fraud and avoid a poor user experience during the payment process. The merchant terminal risk prediction model 402A is configured to compute the EMV chip failure risk score based at least on the EMV chip failure risk data. In a non-limiting example, the EMV chip failure risk score may be a numeric value (e.g., a 3-digit value between 000-999) that is indicative of the likelihood that a terminal will face a fallback rate of over 10% in the next few weeks (e.g., 8 weeks). For example, the merchant EMV chip failure risk score of 423 represents the probability percentage of the merchant 106A having a faulty terminal is 42.3%. Similarly, the merchant EMV chip failure risk score of 789 represents that the probability percentage is 78.9%. It is noted that 000 represents the lowest probability percentage value and 999 represents the highest probability percentage value. In an instance, the EMV chip failure risk score is computed via an XGBoost Classifier model along with embeddings generated using the EMV chip failure risk data. In a particular instance, the respective embeddings may be generated using a graph based machine learning model using the EMV chip failure risk data. In an example, the data elements of the EMV chip failure risk data are illustrated in Table 6 below:

TABLE 6

Merchant country
Industry of merchant
Merchant category code
Total transactions in the past 1 month, 2 months, 4 months, 6 months, 8 months, 10 months, and 12 month
Total amount in the past 1 month, 2 months, 4 months, 6 months, 8 months, 10 months, and 12 month
Total fallback transactions in the past 1 month, 2 months, 4 months, 6 months, 8 months, 10 months, and 12 month
Total fallback amount in the past 1 month, 2 months, 4 months, 6 months, 8 months, 10 months, and 12 month
Total fallback approved transactions in the past 1 month, 2 months, 4 months, 6 months, 8 months, 10 months, and 12 month
Total fallback approved amount in the past 1 month, 2 months, 4 months, 6 months, 8 months, 10 months, and 12 month
Total fallback declined transactions in the past 1 month, 2 months, 4 months, 6 months, 8 months, 10 months, and 12 month
Total fallback declined amount in the past 1 month, 2 months, 4 months, 6 months, 8 months, 10 months, and 12 month
Total fallback fraud transactions in the past 1 month, 2 months, 4 months, 6 months, 8 months, 10 months, and 12 month
Total fallback fraud amount in the past 1 month, 2 months, 4 months, 6 months, 8 months, 10 months, and 12 month
Card present transactions in the past 1 month, 2 months, 4 months, 6 months, 8 months, 10 months, and 12 month
Card present amount in the past 1 month, 2 months, 4 months, 6 months, 8 months, 10 months, and 12 month
Domestic transactions in the past 1 month, 2 months, 4 months, 6 months, 8 months, 10 months, and 12 month
Domestic amount in the past 1 month, 2 months, 4 months, 6 months, 8 months, 10 months, and 12 month The merchant terminal risk prediction model 402B determines the terminal fraud attack risk score based on predicting that the terminal will experience a sudden fraud attack in the next few days (e.g., 3 days), the fraud basis points exceeding the historical average fraud rate for this terminal. The terminal fraud attack risk score enables the acquirer to proactively adjust the terminal to prevent attacks from occurring in the future. The merchant terminal risk prediction model 402B is configured to compute the terminal fraud attack risk score based at least on the terminal fraud attack risk data. In a non-limiting example, the merchant terminal fraud attack risk score may be a numeric value (e.g., a 3-digit value between 000-999) that is indicative of the risk for a specific terminal to experience a high fraud attack. For example, the terminal fraud attack risk score of 275 represents the probability percentage of the merchant 106A encountering a terminal based fraud is 27.5%. Similarly, the terminal fraud attack risk score of 789 represents that the probability percentage is 78.9%. It is noted that 000 represents the lowest probability percentage value and 999 represents the highest probability percentage value. In an instance, the Terminal fraud attack risk score is computed via an XGBoost Classifier model along with embeddings generated using the terminal fraud attack risk data. In a particular instance, the respective embeddings may be generated using a graph based machine learning model using the terminal fraud attack risk data. In an example, the data elements of the terminal fraud attack risk data are illustrated in Table 7 below:

TABLE 7

Approval amount in last 0 to 1 day, 1 to 3 days, 3 to 5 days, 5 to 7 days, 7 to 14 days, 14 to 21 days
Approval count in last 0 to 1 day, 1 to 3 days, 3 to 5 days, 5 to 7 days, 7 to 14 days, 14 to 21 days
Average of approval count size in 0 to 1 day, 1 to 3 days, 3 to 5 days, 5 to 7 days, 7 to 14 days, 14 to 21 days
Average of Card Count in 0 to 1 day, 1 to 3 days, 3 to 5 days, 5 to 7 days, 7 to 14 days, 14 to 21 days
Average of Decline count size in 0 to 1 day, 1 to 3 days, 3 to 5 days, 5 to 7 days, 7 to 14 days, 14 to 21 days
Count of Transactions in last 0 to 1 day, 1 to 3 days, 3 to 5 days, 5 to 7 days, 7 to 14 days, 14 to 21 days when AVS request and response match
Count of Transactions in last 0 to 1 day, 1 to 3 days, 3 to 5 days, 5 to 7 days, 7 to 14 days, 14 to 21 days when AVS request and response not matched
Count of Transactions in last 0 to 1 day, 1 to 3 days, 3 to 5 days, 5 to 7 days, 7 to 14 days, 14 to 21 days when AVS request and response not processed
Count of approval transactions in last 0 to 1 day, 1 to 3 days, 3 to 5 days, 5 to 7 days, 7 to 14 days, 14 to 21 days when card not present
Count of decline transactions in last 0 to 1 day, 1 to 3 days, 3 to 5 days, 5 to 7 days, 7 to 14 days, 14 to 21 days when card not present
Amount of approval transactions in last 0 to 1 day, 1 to 3 days, 3 to 5 days, 5 to 7 days, 7 to 14 days, 14 to 21 days when card not present
Amount of decline transactions in last 0 to 1 day, 1 to 3 days, 3 to 5 days, 5 to 7 days, 7 to 14 days, 14 to 21 days when card not present TABLE 7-continued Count of approval transactions in last 0 to 1 day, 1 to 3 days, 3 to 5 days, 5 to 7 days, 7 to 14 days, 14 to 21 days when the card is present
Count of decline transactions in last 0 to 1 day, 1 to 3 days, 3 to 5 days, 5 to 7 days, 7 to 14 days, 14 to 21 days when the card is present
Amount of approval transactions in last 0 to 1 day, 1 to 3 days, 3 to 5 days, 5 to 7 days, 7 to 14 days, 14 to 21 days when card is present
Amount of decline transactions in last 0 to 1 day, 1 to 3 days, 3 to 5 days, 5 to 7 days, 7 to 14 days, 14 to 21 days when card is present
Count of transactions in last 0 to 1 day, 1 to 3 days, 3 to 5 days, 5 to 7 days, 7 to 14 days, 14 to 21 days when decline reason code is 03
Count of transactions in last 0 to 1 day, 1 to 3 days, 3 to 5 days, 5 to 7 days, 7 to 14 days, 14 to 21 days when decline reason code is 04
Count of transactions in last 0 to 1 day, 1 to 3 days, 3 to 5 days, 5 to 7 days, 7 to 14 days, 14 to 21 days when decline reason code is 05
Count of transactions in last 0 to 1 day, 1 to 3 days, 3 to 5 days, 5 to 7 days, 7 to 14 days, 14 to 21 days when decline reason code is 12
Count of transactions in last 0 to 1 day, 1 to 3 days, 3 to 5 days, 5 to 7 days, 7 to 14 days, 14 to 21 days when decline reason code is 13
Count of transactions in last 0 to 1 day, 1 to 3 days, 3 to 5 days, 5 to 7 days, 7 to 14 days, 14 to 21 days when decline reason code is 14
Count of transactions in last 0 to 1 day, 1 to 3 days, 3 to 5 days, 5 to 7 days, 7 to 14 days, 14 to 21 days when decline reason code is 41
Count of transactions in last 0 to 1 day, 1 to 3 days, 3 to 5 days, 5 to 7 days, 7 to 14 days, 14 to 21 days when decline reason code is 54
Count of transactions in last 0 to 1 day, 1 to 3 days, 3 to 5 days, 5 to 7 days, 7 to 14 days, 14 to 21 days when decline reason code is 55
Count of transactions in last 0 to 1 day, 1 to 3 days, 3 to 5 days, 5 to 7 days, 7 to 14 days, 14 to 21 days when decline reason code is 57
Count of transactions in last 0 to 1 day, 1 to 3 days, 3 to 5 days, 5 to 7 days, 7 to 14 days, 14 to 21 days when decline reason code is 58
Count of transactions in last 0 to 1 day, 1 to 3 days, 3 to 5 days, 5 to 7 days, 7 to 14 days, 14 to 21 days when decline reason code is 61
Count of transactions in last 0 to 1 day, 1 to 3 days, 3 to 5 days, 5 to 7 days, 7 to 14 days, 14 to 21 days when decline reason code is 62
Count of transactions in last 0 to 1 day, 1 to 3 days, 3 to 5 days, 5 to 7 days, 7 to 14 days, 14 to 21 days when decline reason code is 63
Count of transactions in last 0 to 1 day, 1 to 3 days, 3 to 5 days, 5 to 7 days, 7 to 14 days, 14 to 21 days when decline reason code is 65
Count of transactions in last 0 to 1 day, 1 to 3 days, 3 to 5 days, 5 to 7 days, 7 to 14 days, 14 to 21 days when decline reason code is 71
Count of transactions in last 0 to 1 day, 1 to 3 days, 3 to 5 days, 5 to 7 days, 7 to 14 days, 14 to 21 days when decline reason code is 78
Count of transactions in last 0 to 1 day, 1 to 3 days, 3 to 5 days, 5 to 7 days, 7 to 14 days, 14 to 21 days when decline reason code is 86
Count of approval transactions in last 0 to 1 day, 1 to 3 days, 3 to 5 days, 5 to 7 days, 7 to 14 days, 14 to 21 days when product group type is credit
Credit count decline in last 0 to 1 day, 1 to 3 days, 3 to 5 days, 5 to 7 days, 7 to 14 days, 14 to 21 days
Credit spend approval in last 0 to 1 day, 1 to 3 days, 3 to 5 days, 5 to 7 days, 7 to 14 days, 14 to 21 days
Credit spend decline in last 0 to 1 day, 1 to 3 days, 3 to 5 days, 5 to 7 days, 7 to 14 days, 14 to 21 days
Crossborder count approval in last 0 to 1 day, 1 to 3 days, 3 to 5 days, 5 to 7 days, 7 to 14 days, 14 to 21 days
Crossborder count decline in last 0 to 1 day, 1 to 3 days, 3 to 5 days, 5 to 7 days, 7 to 14 days, 14 to 21 days
Crossborder spend approval in last 0 to 1 day, 1 to 3 days, 3 to 5 days, 5 to 7 days, 7 to 14 days, 14 to 21 days
Crossborder spend decline in last 0 to 1 day, 1 to 3 days, 3 to 5 days, 5 to 7 days, 7 to 14 days, 14 to 21 days
Card verification value (CVV) request match transaction count in last 0 to 1 day, 1 to 3 days, 3 to 5 days, 5 to 7 days, 7 to 14 days, 14 to 21 days
Card verification value (CVV) request not match transaction count in last 0 to 1 day, 1 to 3 days, 3 to 5 days, 5 to 7 days, 7 to 14 days, 14 to 21 days
Card verification value (CVV) request not processed transaction count in last 0 to 1 day, 1 to 3 days, 3 to 5 days, 5 to 7 days, 7 to 14 days, 14 to 21 days
Debit count approval in last 0 to 1 day, 1 to 3 days, 3 to 5 days, 5 to 7 days, 7 to 14 days, 14 to 21 days
Debit count decline in last 0 to 1 day, 1 to 3 days, 3 to 5 days, 5 to 7 days, 7 to 14 days, 14 to 21 days
Debit spend approval in last 0 to 1 day, 1 to 3 days, 3 to 5 days, 5 to 7 days, 7 to 14 days, 14 to 21 days
Debit spend decline in last 0 to 1 day, 1 to 3 days, 3 to 5 days, 5 to 7 days, 7 to 14 days, 14 to 21 days
Decline amount in last 0 to 1 day, 1 to 3 days, 3 to 5 days, 5 to 7 days, 7 to 14 days, 14 to 21 days
Decline count in last 0 to 1 day, 1 to 3 days, 3 to 5 days, 5 to 7 days, 7 to 14 days, 14 to 21 days
Decline rate in last 0 to 1 day, 1 to 3 days, 3 to 5 days, 5 to 7 days, 7 to 14 days, 14 to 21 days TABLE 7-continued Domestic count approval in last 0 to 1 day, 1 to 3 days, 3 to 5 days, 5 to 7 days, 7 to 14 days, 14 to 21 days
Domestic count decline in last 0 to 1 day, 1 to 3 days, 3 to 5 days, 5 to 7 days, 7 to 14 days, 14 to 21 days
Domestic spend approval in last 0 to 1 day, 1 to 3 days, 3 to 5 days, 5 to 7 days, 7 to 14 days, 14 to 21 days
Domestic spend decline in last 0 to 1 day, 1 to 3 days, 3 to 5 days, 5 to 7 days, 7 to 14 days, 14 to 21 days
E-commerce count approval in last 0 to 1 day, 1 to 3 days, 3 to 5 days, 5 to 7 days, 7 to 14 days, 14 to 21 days
E-commerce count decline in last 0 to 1 day, 1 to 3 days, 3 to 5 days, 5 to 7 days, 7 to 14 days, 14 to 21 days
E-commerce spend approval in last 0 to 1 day, 1 to 3 days, 3 to 5 days, 5 to 7 days, 7 to 14 days, 14 to 21 days
E-commerce spend decline in last 0 to 1 day, 1 to 3 days, 3 to 5 days, 5 to 7 days, 7 to 14 days, 14 to 21 days
Prepaid count approval in last 0 to 1 day, 1 to 3 days, 3 to 5 days, 5 to 7 days, 7 to 14 days, 14 to 21 days
Prepaid count decline in last 0 to 1 day, 1 to 3 days, 3 to 5 days, 5 to 7 days, 7 to 14 days, 14 to 21 days
Prepaid spend approval in last 0 to 1 day, 1 to 3 days, 3 to 5 days, 5 to 7 days, 7 to 14 days, 14 to 21 days
Prepaid spend decline in last 0 to 1 day, 1 to 3 days, 3 to 5 days, 5 to 7 days, 7 to 14 days, 14 to 21 days
Recurring count approval in last 0 to 1 day, 1 to 3 days, 3 to 5 days, 5 to 7 days, 7 to 14 days, 14 to 21 days
Recurring count decline in last 0 to 1 day, 1 to 3 days, 3 to 5 days, 5 to 7 days, 7 to 14 days, 14 to 21 days
Recurring spend approval in last 0 to 1 day, 1 to 3 days, 3 to 5 days, 5 to 7 days, 7 to 14 days, 14 to 21 days
Recurring spend decline in last 0 to 1 day, 1 to 3 days, 3 to 5 days, 5 to 7 days, 7 to 14 days, 14 to 21 days
The total amount in last 0 to 1 day, 1 to 3 days, 3 to 5 days, 5 to 7 days, 7 to 14 days, 14 to 21 days
Total transaction amount in last 0 to 1 day, 1 to 3 days, 3 to 5 days, 5 to 7 days, 7 to 14 days, 14 to 21 days
Total transaction count in last 0 to 1 day, 1 to 3 days, 3 to 5 days, 5 to 7 days, 7 to 14 days, 14 to 21 days
Transaction size between 1-5$, 5-10$, 10-15$, 15-30$, 30-50$, 50-100$ in last 0 to 1 day, 1 to 3 days, 3 to 5 days, 5 to 7 days, 7 to 14 days, 14 to 21 days
Transaction size less than 1$ in last 0 to 1 day, 1 to 3 days, 3 to 5 days, 5 to 7 days, 7 to 14 days, 14 to 21 days
Transaction size less than 10$ in last 0 to 1 day, 1 to 3 days, 3 to 5 days, 5 to 7 days, 7 to 14 days, 14 to 21 days In an example, the terminal information compromise risk score indicates that the terminal used by the merchant 106A is at risk of being involved in an information or data compromise event. The merchant terminal risk prediction model 402C determines the terminal information compromise risk score based on determining that the fraud reported by various cardholders is identified to have prior transaction history with the specific terminal. The terminal information compromise risk score enables the acquirer server 110 to enhance terminal security protocols to mitigate the potential breach. The merchant terminal risk prediction model 402C is configured to compute the terminal information compromise risk score based at least on the terminal information compromise risk data. In a non-limiting example, the merchant terminal information compromise risk score may be a numeric value (e.g., a 3-digit value between 000-999) that is indicative of the likelihood that a terminal is a location from where payment card credentials of various cardholders were stolen and subsequently used at other merchants to commit fraudulent transactions. For example, the terminal information compromise risk score of 428 represents the probability percentage of the merchant 106A encountering a terminal information compromise is 42.8%. Similarly, the terminal information compromise risk score of 769 represents that the probability percentage is 76.9%. It is noted that 000 represents the lowest probability percentage value and 999 represents the highest probability percentage value. In an instance, the Terminal information compromise score is computed via an XGBoost Classifier model along with embeddings generated using the terminal information compromise risk data. In an example, the data elements of the terminal information compromise risk data are illustrated in Table 8 below:

TABLE 8

Figure 5:
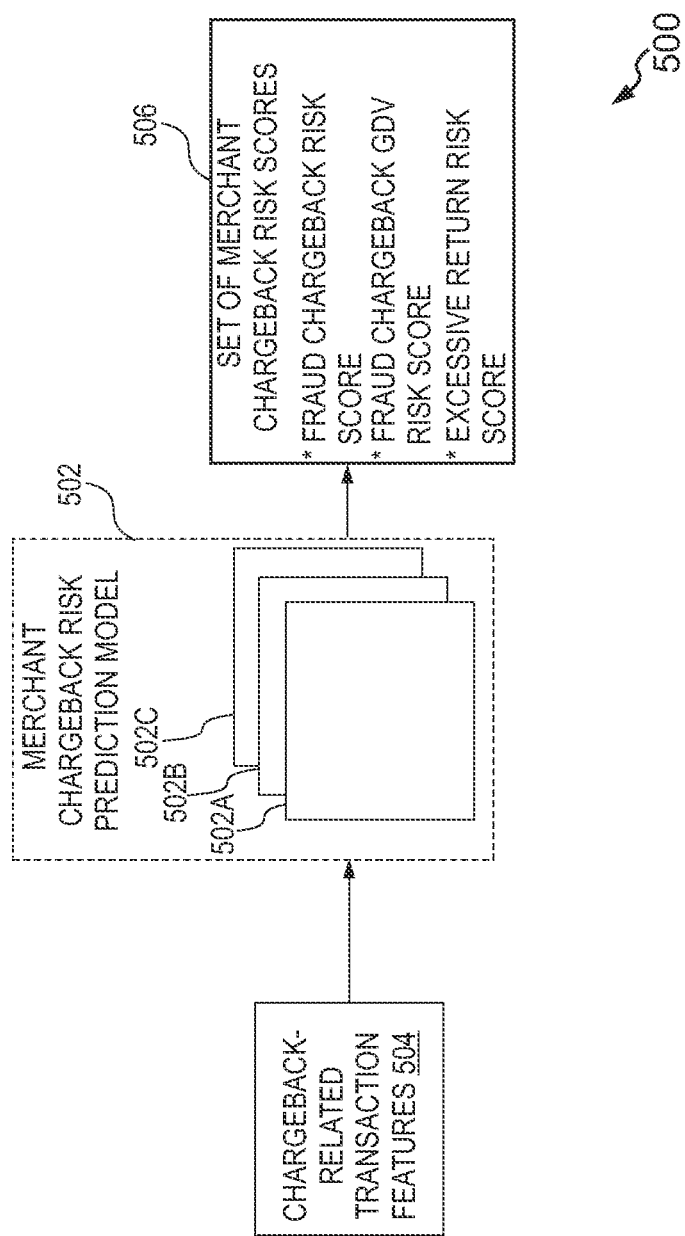
FIG. 5 illustrates a simplified block diagram representation for predicting a set of merchant chargeback risk scores for the merchants, in accordance with an embodiment of the present disclosure.

Total fraud cards transacted at merchant in last 3 months
Total cards transacted at merchant in last 3 months
Merchant category
Merchant industry
Merchant country
Terminal identifier
Merchant identifier
Merchant region
Decline rate in last 1 day, 7 days, 15 days, 1 month, 2 months, 3 months
Fraud rate in last 1 day, 7 days, 15 days, 1 month, 2 months, 3 months
Merchant score from the CPP model
Merchant rank from the CPP model
Merchant regional rank from the CPP model
Merchant country level rank from the CPP model
Channel of the transaction and its interaction
Whether the merchant is enabled 3D-secure 2.0
Aggregated DI score for a merchant and its interaction
Weather merchant is flagged by the dark web analysis
Fraud report date of a card FIG. 5 illustrates a simplified block diagram representation 500 for predicting a set of merchant chargeback risk scores 506 for the merchants 106, in accordance with an embodiment of the present disclosure.

In an embodiment, the merchant chargeback risk prediction model 502 is configured to compute the chargeback risk scores for a payment transaction that is ongoing between the merchant 106A and the cardholder 104. The merchant chargeback risk prediction model 502 predicts the set of chargeback risk scores associated with the merchant 106A of the acquirer. The merchant chargeback risk prediction model 502 may include one or more machine learning models (see, 502A, 502B, and 502C) for determining the chargeback risk score for the merchant 106A of the acquirer. In an embodiment, the merchant chargeback risk prediction model 502 is trained using a plurality of historical merchant-related transaction data.

In an embodiment, the merchant chargeback risk prediction model 502 computes the set of merchant chargeback risk scores 506 that is indicative of the probability values of a chargeback being requested for the ongoing payment transaction due to fraudulent activity by the merchant 106A. In an embodiment, the set of merchant chargeback risk scores 506 may include at least fraud chargeback risk score, fraud chargeback GDV risk score, and excessive return risk score. The set of merchant chargeback risk scores 506 is determined by the model based on the chargeback-related transaction features 504 generated by the feature determining engine. To that end, it should be understood that the set of merchant chargeback risk scores 506 is determined based, at least in part, on the fraud chargeback risk data, fraud chargeback GDV data, and excessive return risk data.

In an example, the fraud chargeback risk score indicates the likelihood of short-term fraud chargeback risk. In an example, the fraud chargeback risk score may be calculated for a predetermined time period such as 3 months, 6 months, 9 months, and the like. The merchant chargeback risk prediction model 502A determines the fraud chargeback risk score based on determining whether the merchant 106A has received higher than average chargeback volume during a predetermined evaluation period such as the past 3 months and the like. The fraud chargeback risk score enables the acquirer server 110 to manage expected chargeback volumes related to fraud over time. Further, the acquirer server 110 may take mitigating actions with the merchants at the most risk and highest anticipated volumes. The merchant chargeback risk prediction model 502A is configured to compute the fraud chargeback risk score based at least on the fraud chargeback risk data. In a non-limiting example, the fraud chargeback risk score may be a numeric value (e.g., a 3-digit value between 000-999) that is indicative of the likelihood that a merchant may experience at least one fraud-related chargeback in the next few months (e.g., 3 months). For example, the fraud chargeback risk score of 429 represents the probability percentage of the merchant 106A encountering a chargeback due to fraud is 42.9%. Similarly, the fraud chargeback risk score of 779 represents that the probability percentage is 77.9%. It is noted that 000 represents the lowest probability percentage value and 999 represents the highest probability percentage value. In an instance, the Fraud chargeback risk score is computed via an XGBoost Classifier model along with embeddings generated using the fraud chargeback risk data. In an example, the data elements of the fraud chargeback risk data are illustrated in Table 9 below:

TABLE 9

Total fraud cards transacted at the merchant in last 3 months
Total cards transacted at the merchant in last 3 months
Merchant category
Merchant industry
Merchant country
Terminal identifier
Merchant identifier
Merchant region
Decline rate in last 1 day, 7 days, 15 days, 1 month, 2 months, 3 months
Fraud rate in last 1 day, 7 days, 15 days, 1 month, 2 months, 3 months
Merchant score from the CPP model
Merchant rank from the CPP model
Merchant regional rank from the CPP model
Merchant country level rank from the CPP model
Channel of the transaction and its interaction
Whether the merchant is enabled 3D-secure 2.0
Aggregated DI score for a merchant and its interaction
Weather merchant is flagged by the dark web analysis
Fraud report date of a card In an example, the fraud chargeback GDV risk score indicates the expected short-term fraud chargeback risk GDV. In an example, the fraud chargeback GDV risk score may be calculated for a predetermined time period such as 3 months, 6 months, 9 months, and the like. The merchant chargeback risk prediction model 502B determines the fraud chargeback GDV risk score based on determining the actual amount of fraud-related chargeback GDV determined or captured among the top scoring merchants. The fraud chargeback GDV risk score enables the acquirer server 110 to manage expected chargeback volumes related to fraud over time. Further, the acquirer server 110 may take mitigating actions with the merchants at the most risk and highest anticipated volumes. The merchant chargeback risk prediction model 502B is configured to compute the fraud chargeback GDV risk score based at least on the fraud chargeback GDV risk data. In a non-limiting example, the fraud chargeback GDV risk score may be a numeric value (e.g., a dollar amount) that is indicative of the expected GDV to be charged back as a fraud based on the predicted risk in the fraud chargeback risk score. In an instance, the Fraud chargeback GDV risk score is computed via an XGBoost regressor model along with embeddings generated using fraud chargeback GDV risk data. In an example, the data elements of the fraud chargeback GDV risk data are similar to the data elements of the fraud chargeback risk data illustrated in Table 9.

In an example, the excessive return risk score indicates the likelihood of excessive returns by the buyers, i.e., the cardholders when compared with a peer set of a plurality of merchants. The peer set of the plurality of merchants may include return rate data associated with the plurality of merchants that may be considered as the peer of the merchant 106A engaged in the ongoing transaction. For example, a peer set of merchants may represent a set of merchants with the same MCC. It should be understood that an increase in return rate may be indicative of fraud and represents chargeback risk. The merchant chargeback risk prediction model 502C determines the excessive return risk score based on determining that the transaction return rate of the merchant 106A is significantly higher compared to peer-set and industry benchmarks. The excessive return risk score enables the acquirer server 110 to analyze the impact of returns and expected chargeback. This analysis may help the acquirer server 110 to analyze the impact of returns on its finances. The merchant chargeback risk prediction model 502C is configured to compute the excessive return risk score based at least on the excessive return risk data. In a non-limiting example, the excessive return risk score may be a numeric value (e.g., a 3-digit value between 000-999) that is indicative of the likelihood that a merchant may experience significantly higher returns. For example, the excessive return risk score of 529 represents the probability percentage of the merchant 106A receiving a return request due to fraud is 52.9%. Similarly, the excessive return risk score of 779 represents that the probability percentage is 77.9%. It is noted that 000 represents the lowest probability percentage value and 999 represents the highest probability percentage value. In an instance, the Excessive return risk score is computed via an XGBoost Classifier model along with embeddings generated using the excessive return risk data. In an example, the data elements of the excessive return risk data are illustrated in Table 10 below:

TABLE 10

Merchant identifier
Acquirer identifier
Return percentage in next 3 months (ct return transaction count/ct transaction count)
If label > 0 then 1 else 0
Return transactions in the next 3 months
Total transactions in the next 3 months
Return transaction amount in next 3 months
Total transaction amount in next 3 months
Total transaction amount in previous 3 months
Weekend transaction amount in previous 3 months
Weekday transaction amount in previous 3 months
Card present transaction amount in previous 3 months
Card not present transaction amount in previous 3 months
Domestic transaction amount in previous 3 months
Crossborder transaction amount in previous 3 months
Domestic card present transaction amount in previous 3 months
Crossborder card present transaction amount in previous 3 months
Domestic card not present transaction amount in previous 3 months
Crossborder card not present transactions amount in previous 3 months
Recurring transaction amount in previous 3 months
Automated teller Machine (ATM) transaction amount in previous 3 months
Pin transaction amount in previous 3 months
Paypass transaction amount in previous 3 months
Wallet transaction amount in previous 3 months
Total transaction count in previous 3 months
Weekend transaction count in previous 3 months
Weekday transaction count in previous 3 months
Card present transaction count in previous 3 months
Card not present transaction count in previous 3 months
Domestic transaction count in previous 3 months
Crossborder transaction count in previous 3 months
Domestic card present transaction count in previous 3 months
Crossborder card present transaction count in previous 3 months
Domestic card not present transaction count in previous 3 months
Crossborder card not present transactions count in previous 3 months
Recurring transaction count in previous 3 months
Automated teller Machine (ATM) transaction count in previous 3 months
Pin transaction count in previous 3 months
Paypass transaction count in previous 3 months
Wallet transaction count in previous 3 months
Total transaction amount returned in previous 3 months
Weekend transaction amount returned in previous 3 months
Weekday transaction amount returned in previous 3 months
Card present transaction amount returned in previous 3 months
Card not present transaction amount returned in previous 3 months
Domestic transaction amount returned in previous 3 months
Crossborder transaction amount returned in previous 3 months
Domestic card present transaction amount returned in previous 3 months
Crossborder card present transaction amount returned in previous 3 months
Domestic card not present transaction amount returned in previous 3 months
Crossborder card not present transactions amount returned in previous 3 months
Recurring transaction amount returned in previous 3 months
Automated teller Machine (ATM) transaction amount returned in previous 3 months
Pin transaction amount returned in previous 3 months
Paypass transaction amount returned in previous 3 months
Wallet transaction amount returned in previous 3 months
Total transaction count returned in previous 3 months
Weekend transaction count returned in previous 3 months
Weekday transaction count returned in previous 3 months
Card present transaction count returned in previous 3 months
Card not present transaction count returned in previous 3 months
Domestic transaction count returned in previous 3 months
Crossborder transaction count returned in previous 3 months
Domestic card present transaction count returned in previous 3 months
Crossborder card present transaction count returned in previous 3 months
Domestic card not present transaction count returned in previous 3 months
Crossborder card not present transactions count returned in previous 3 months
Recurring transaction count returned in previous 3 months
Automated teller Machine (ATM) transaction count returned in previous 3 months
Pin transaction count returned in previous 3 months TABLE 10-continued Paypass transaction count returned in previous 3 months
Wallet transaction count returned in previous 3 months
Qt2 = previous 6 to 3 months. ( 90 to 180 days)
Qt3 = previous 9 to 6 months. (180 to 270 days)
Qt4 = previous 9 to 12 months. (108 to 365 days)

Figure 6:
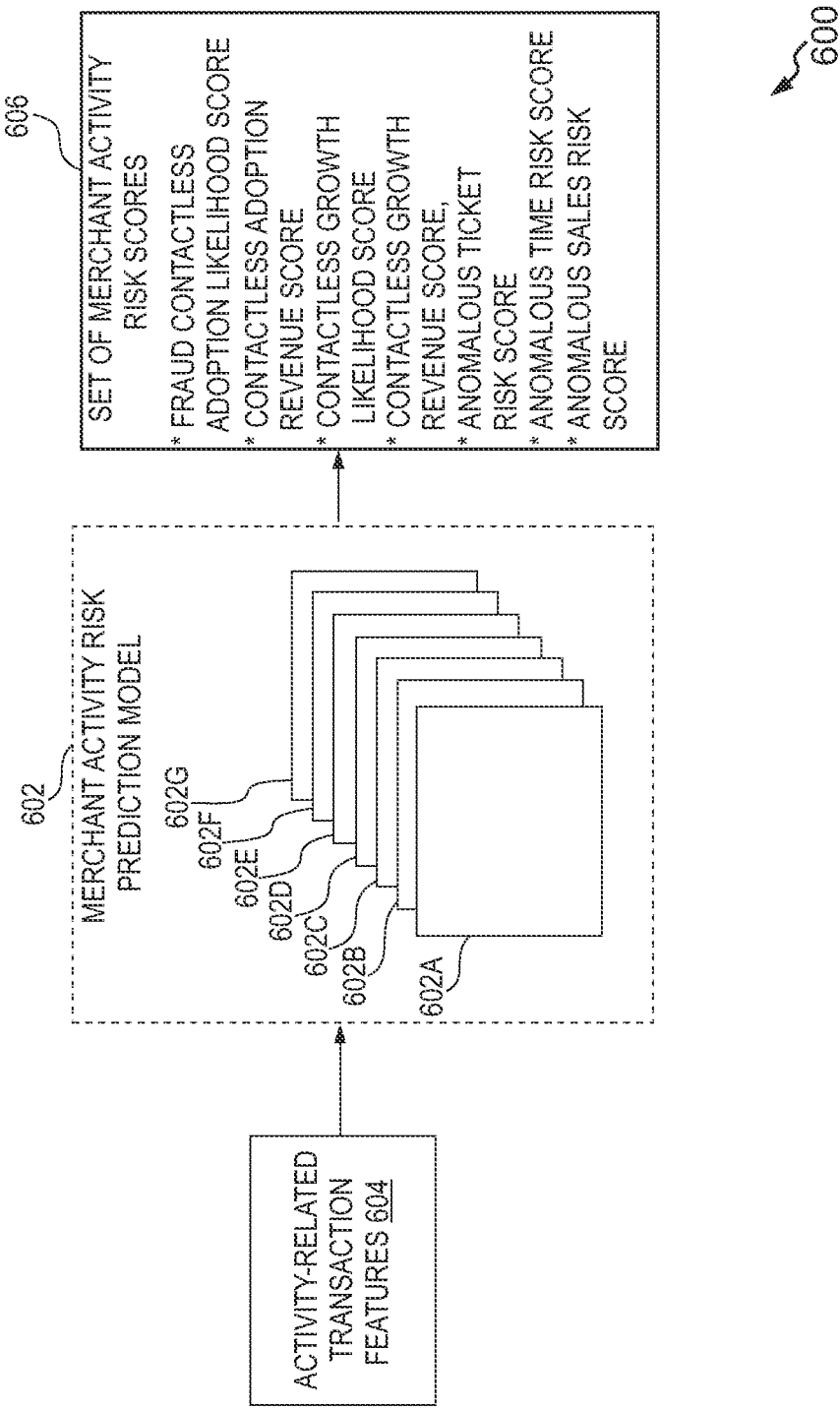
FIG. 6 illustrates a simplified block diagram representation for predicting a set of merchant activity risk scores for the merchants, in accordance with an embodiment of the present disclosure.

FIG. 6 illustrates a simplified block diagram representation 600 for predicting a set of merchant activity risk scores 606 for the merchants 106, in accordance with an embodiment of the present disclosure.

The merchant activity risk prediction model 602 is configured to compute the activity risk scores for the merchant 106A over a predetermined time interval. For example, merchant activity risk scores may be computed for a time interval of 3 months, 6 months, 9 months, and the like. Therefore, unlike the previous scores, the merchant activity risk score is not calculated for a payment transaction in real time. The merchant activity risk prediction model 602 predicts the set of activity risk scores associated with the merchant 106A of the acquirer. The merchant activity risk prediction model 602 may include one or more machine learning models (see, 602A, 602B, 602C, 602D, 602E, 602F, 602G) for determining the activity risk score for the merchant 106A of the acquirer. In an embodiment, the merchant activity risk prediction model 602 is trained using a plurality of historical merchant-related transaction data.

In an embodiment, the merchant activity risk prediction model 602 computes the set of merchant activity risk scores 606 that is indicative of the probability values of the overall activity of the merchant. In an embodiment, the set of merchant activity risk scores 606 may include at least fraud contactless adoption likelihood score, contactless adoption revenue score, contactless growth likelihood score, contactless growth revenue score, anomalous ticket risk score, anomalous time risk score, and anomalous sales risk score. The set of merchant activity risk scores 606 is determined by the merchant activity risk prediction model 602 based on the activity-related transaction features 604 generated by the feature determining engine. To that end, it should be understood that the set of merchant activity risk scores 606 is determined based, at least in part, on the contactless adoption likelihood data, contactless adoption revenue data, contactless growth likelihood data, contactless growth revenue data, anomalous ticket risk data, anomalous time risk data, and anomalous sales risk data.

In an example, the contactless adoption likelihood score indicates the probability of the merchant 106A adopting contactless payments. In other words, the contactless adoption likelihood score indicates the acceptance of contactless payment if the merchant 106A enables it for the first time. The merchant activity risk prediction model 602A determines the contactless adoption likelihood score based on predicting the likelihood of contactless payment adoption if the merchant 106A has not already adopted the contactless payment facility provided by the acquirer. It should be understood that the merchants who receive high scores should be among the top 20% performers in terms of contactless transactions in the next 6 months if they enable the contactless payment facility. The contactless adoption likelihood score enables the acquirer server 110 to prioritize merchant locations with high expected contactless adoption rates for new terminals that support contactless payment facilities. Further, the acquirer server 110 may work with the merchants with high scores to drive more engagement and effectively reduce fraud rates. The merchant activity risk prediction model 602A is configured to compute the contactless adoption likelihood score based at least on the contactless adoption likelihood data. In a non-limiting example, the contactless adoption likelihood score may be a numeric value (e.g., a 3-digit value between 000-999) that is indicative of the likelihood of contactless payment adoption. For example, the contactless adoption likelihood score of 529 represents the probability percentage of the merchant 106A adopting the contactless payment facility is 52.9%. It is noted that 000 represents the lowest probability percentage value and 999 represents the highest probability percentage value.

In an example, the contactless adoption revenue score indicates the estimated contactless revenue potential for the merchant 106A, if they adopt the contactless payment facility. The merchant activity risk prediction model 602B determines the contactless adoption revenue score based on predicting the revenue growth of the merchant 106A within the next few months (e.g., 3 months) if they adopt contactless payments. The contactless adoption revenue score enables the acquirer server 110 to prioritize merchant locations with high expected contactless adoption rates for new terminals that support contactless payment facilities. Further, the acquirer server 110 may work with the merchants with high scores to drive more engagement and effectively reduce fraud rates. The merchant activity risk prediction model 602B is configured to compute the contactless adoption revenue score based at least on the contactless adoption revenue data. In a non-limiting example, the contactless adoption revenue score may be a numeric value (e.g., a 3-digit value between 000-999) that is indicative of the revenue growth due to contactless payments. For example, the contactless adoption revenue score of 524 represents the probability percentage of the merchant's growth in revenue due to the adoption of the contactless payment facility is 52.4%. It is noted that 000 represents the lowest probability percentage value and 999 represents the highest probability percentage value.

In an example, the contactless growth likelihood score indicates the probability of growth in contactless payments at the merchant 106A if enhancements and communication are made. The merchant activity risk prediction model 602C determines the contactless growth likelihood score is determined by the prediction model based on predicting the increase in contactless transaction volume (i.e., the percentage of contactless transactions among total transactions) of the merchant 106A in the next few days (e.g., 30 days). The contactless growth likelihood score enables the acquirer server 110 to prioritize merchant locations with high expected contactless adoption rates for new terminals that support contactless payment facilities. Further, the acquirer server 110 may work with the merchants with high scores to drive more engagement and effectively reduce fraud rates. The merchant activity risk prediction model 602C is configured to compute the contactless growth likelihood score based at least on the contactless growth likelihood data. In a non-limiting example, the contactless growth likelihood score may be a numeric value (e.g., a 3-digit value between 000-999) that is indicative of the likelihood that there may be growth in contactless payments. For example, the contactless growth likelihood score of 54 represents the probability percentage of the likelihood of merchant's growth due to the contactless payment facility is 5.4%. It is noted that 000 represents the lowest probability percentage value and 999 represents the highest probability percentage value.

In an example, the contactless growth revenue score indicates the estimated revenue potential for merchant revenue growth if enhancements and communication are made. The merchant activity risk prediction model 602D determines the contactless growth revenue score based on predicting the increase in contactless revenue (i.e., the percentage of contactless revenue among total transactions) of the merchant 106A in the next few days (e.g., 30 days). The contactless growth revenue score enables the acquirer server 110 to prioritize merchant locations with high expected contactless adoption rates for new terminals that support contactless payment facilities. Further, the acquirer server 110 may work with the merchant 106A with high scores to drive more engagement and effectively reduce fraud rates. The merchant activity risk prediction model 602D is configured to compute the contactless growth revenue score based at least on the contactless growth revenue data. In a non-limiting example, the contactless growth revenue score may be a numeric value (e.g., a 3-digit value between 000-999) that is indicative of the revenue growth of the merchant 106A. For example, the contactless growth revenue score of 84 represents the probability percentage of the likelihood of merchant's growth in revenue contactless payment facility is 8.4%. It is noted that 000 represents the lowest probability percentage value and 999 represents the highest probability percentage value.

In an example, the anomalous ticket risk score indicates the likelihood of the merchant 106A encountering an abnormal volume of transactions with unexpected ticket sizes. The merchant activity risk prediction model 602E determines the anomalous ticket risk score based on determining that merchants with high daily reported fraud and ticket sizes do not fall within the historical average ranges at that merchant. The anomalous ticket risk score enables the acquirer server 110 to reach out to merchants and explore the possible reasoning behind the significant change in their normal activity. Further, it enables the acquirer server 110 to identify changes in merchant 106A business that were not disclosed or a fraudulent activity that may be taking place which was not captured by other risk scores. The merchant activity risk prediction model 602E is configured to compute the anomalous ticket risk score based at least on the anomalous ticket risk data. In a non-limiting example, the anomalous ticket risk score may be a numeric value (e.g., a 3-digit value between 000-999) that is indicative of a given transaction being a fraudulent anomaly due to unusual ticket size. For example, the anomalous ticket risk score of 784 represents the probability percentage of the merchant 106A encountering a fraud is 78.4%. It is noted that 000 represents the lowest probability percentage value and 999 represents the highest probability percentage value. In an example, the data elements of the anomalous ticket risk data are illustrated in Table 11 below:

TABLE 11

Transaction amount

In an example, the anomalous time risk score indicates the likelihood of the merchant 106A encountering an abnormal volume of transactions outside of the normal operating hours of the merchant 106A. For example, a payment request worth $1000 at a grocery store at 1 AM may indicate fraudulent activity. The merchant activity risk prediction model 602F determines the anomalous time risk score based on determining that merchants with high daily reported fraud do not fall within the historical time range at that merchant. The anomalous time risk score enables the acquirer server 110 to reach out to merchants and explore the possible reasoning behind the significant change in their normal activity. Further, it enables the acquirer server 110 to identify changes in merchant 106A business that were not disclosed or a fraudulent activity that may be taking place which was not captured by other risk scores. The merchant activity risk prediction model 602F is configured to compute the anomalous time risk score based at least on the anomalous time risk data. In a non-limiting example, the anomalous time risk score may be a numeric value (e.g., a 3-digit value between 000-999) that is indicative of the likelihood that a given transaction is a fraudulent anomaly due to the timing of the transaction being unusual. For example, the anomalous time risk score of 684 represents the probability percentage of the merchant 106A encountering a fraud is 68.4%. It is noted that 000 represents the lowest probability percentage value and 999 represents the highest probability percentage value. In an example, the data elements of the anomalous time risk data are illustrated in Table 12 below:

TABLE 12

Total fraud transactions count of the terminal on the 1st day, 2nd day, and 365th day
Total transactions count of the terminal on the 1st day, 2nd day, and 365th day
Total transaction amount of the terminal on the 1st day, 2nd day, and 365th day
10000*total_fraud_transaction_count/total_transaction_count of the terminal on the 1st day, 2nd day, and 365th day In an example, the anomalous sales risk score indicates the likelihood of the merchant 106A encountering an abnormal volume of transactions with unexpected total sales. The merchant activity risk prediction model 602G determines the anomalous sales risk score based on determining those merchants with high daily reported fraud and sales volume, that do not fall within the historical average range at that merchant. The anomalous sales risk score enables the acquirer server 110 to reach out to merchants and explore the possible reasoning behind the significant change in their normal activity. Further, it enables the acquirer server 110 to identify changes in merchant business that were not disclosed or a fraudulent activity that may be taking place which was not captured by other risk scores. The merchant activity risk prediction model 602G is configured to compute the anomalous sales risk score based at least on the anomalous sales risk data. In a non-limiting example, the anomalous sales risk score may be a numeric value (e.g., a 3-digit value between 000-999) that is indicative of the likelihood that a given transaction is a fraudulent anomaly due to unusual sales volume on a given day. For example, the anomalous sales risk score of 604 represents the probability percentage of the merchant 106A encountering fraud is 60.4%. It is noted that 000 represents the lowest probability percentage value and 999 represents the highest probability percentage value. In an example, the data elements of the anomalous sales risk data are illustrated in Table 13 below:

TABLE 13

Figure 7:
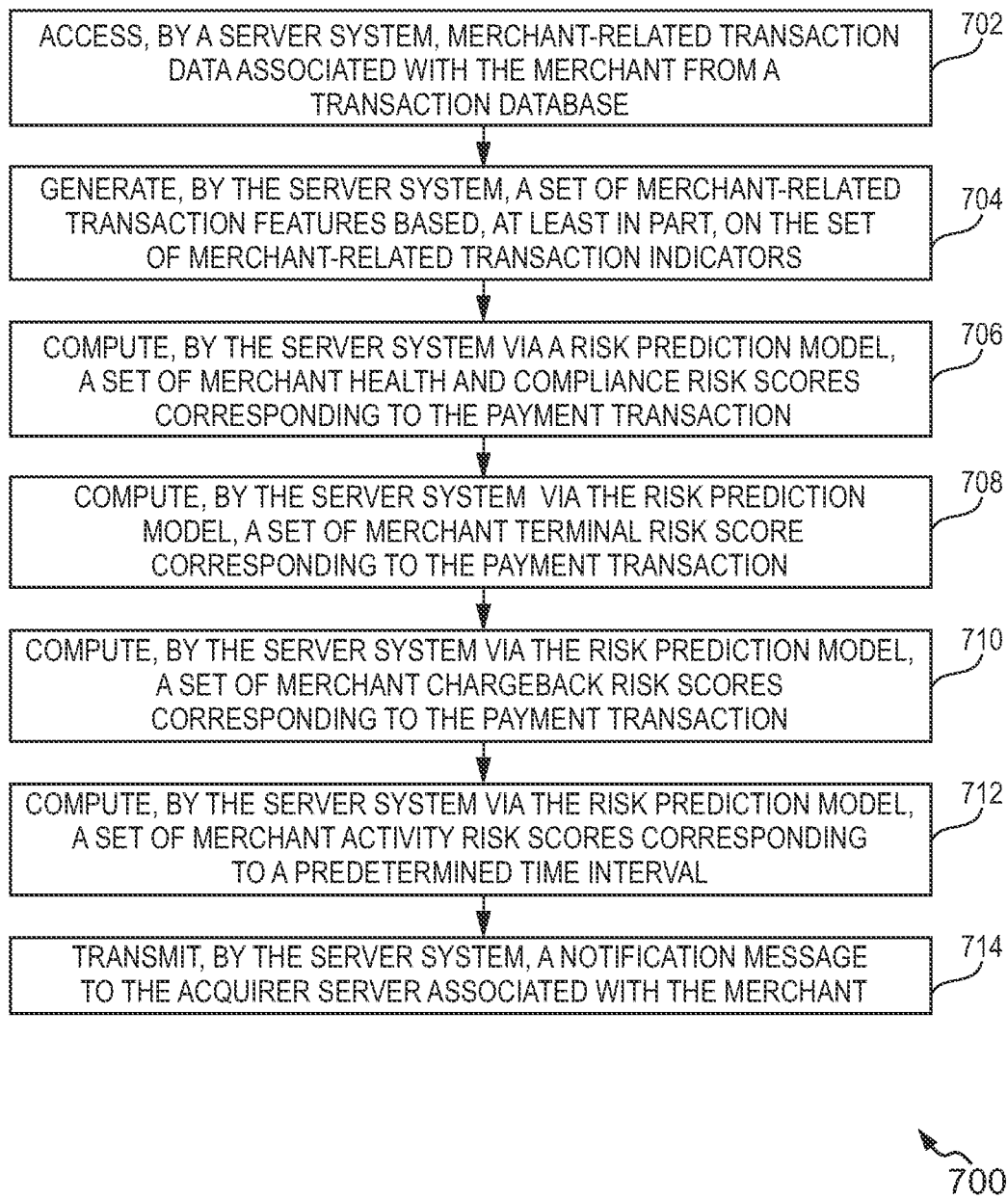
FIG. 7 illustrates a flow chart of a computer-implemented method for predicting merchant-related risk scores of the merchant, in accordance with an embodiment of the present disclosure.

Timestamp at the day level
Number of transactions for the corresponding timestamp
Total amount for the corresponding timestamp FIG. 7 illustrates a flow chart of a computer-implemented method 700 for predicting merchant-related risk scores of the merchant, in accordance with an embodiment of the present disclosure. The method 700 depicted in the flow chart may be executed by, for example, a computer system. The computer system is identical to the server system 200. Operations of the flow chart of the method 700, and combinations of operations in the flow chart of the method 700, may be implemented by, for example, hardware, firmware, a processor, circuitry, and/or a different device associated with the execution of software that includes one or more computer program instructions. It is noted that the operations of the method 700 can be described and/or practiced by using a system other than these computer systems. The method 700 starts at operation 702.

At operation 702, the method 700 includes accessing, by a server system 200, merchant-related transaction data associated with the merchant 106A from a transaction database 118. The merchant-related transaction data may include at least a set of merchant-related transaction indicators corresponding to payment transactions performed by a plurality of cardholders with the merchant 106A.

At operation 704, the method 700 includes generating, by the server system 200, a set of merchant-related transaction features based, at least in part, on the set of merchant-related transaction indicators.

At operation 706, the method 700 includes computing, by the server system 200 via a risk prediction model, a set of merchant health and compliance risk scores 306 corresponding to the payment transaction. In an example, the risk prediction model is the merchant health and compliance risk prediction model 302. The set of merchant health and compliance risk scores 306 is computed based, at least in part, on the set of transaction features. Each risk score of the set of merchant health and compliance risk scores 306 indicates health and compliance behavioral data of the merchant 106A in real-time.

At operation 708, the method 700 includes computing, by the server system 200 via the risk prediction model, a set of merchant terminal risk scores 406 corresponding to the payment transaction. In an example, the risk prediction model is the merchant terminal risk prediction model 402. The set of merchant terminal risk scores 406 is computed based, at least in part, on the set of transaction features. Each risk score of the set of merchant terminal risk scores 406 indicates terminal risk data of the merchant 106A in real time.

At operation 710, the method 700 includes computing, by the server system 200 via the risk prediction model, a set of merchant chargeback risk scores 506 corresponding to the payment transaction. In an example, the risk prediction model is the merchant chargeback risk prediction model 502. The set of merchant chargeback risk scores 506 is computed based, at least in part, on the set of transaction features. Each risk score of the set of merchant chargeback risk scores 506 indicates terminal risk data of the merchant 106A in real time.

At operation 712, the method 700 includes computing, by the server system 200 via the risk prediction model, a set of merchant activity risk scores 606 corresponding to a predetermined time interval. In an example, the risk prediction model is the merchant activity risk prediction model 602. The set of merchant activity risk scores 606 is computed based, at least in part, on the set of transaction features. Each of the set of merchant activity risk scores 606 indicates the activity data of the merchant 106A within the predetermined time period.

At operation 714, the method 700 includes transmitting, by the server system 200, a notification message to the acquirer server 110 associated with the merchant 106A. The notification message may include at least the set of merchant health and compliance risk scores, the set of merchant terminal risk scores, the set of chargeback risk scores, and the set of merchant activity risk scores 606.

The sequence of operations of the method 700 need not be necessarily executed in the same order as they are presented. Further, one or more operations may be grouped together and performed in form of a single step, or one operation may have several sub-steps that may be performed in parallel or in a sequential manner.

Figure 8:
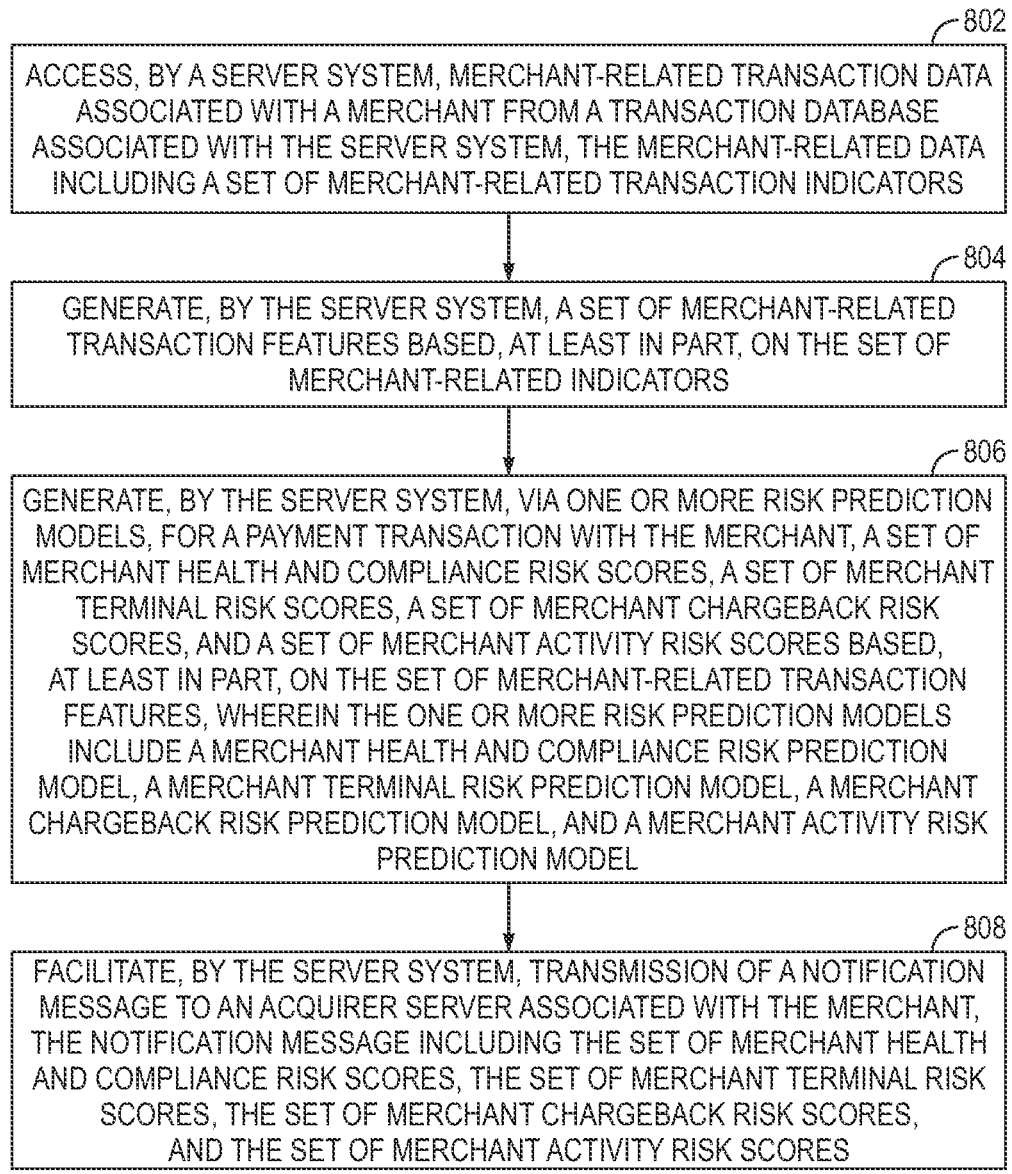
FIG. 8 illustrates a flow chart of a computer-implemented method for predicting merchant-related risk scores of the merchant, in accordance with another embodiment of the present disclosure.

FIG. 8 illustrates a flow chart of a computer-implemented method 800 for predicting merchant-related risk scores of the merchant, in accordance with another embodiment of the present disclosure. The method 800 depicted in the flow chart may be executed by, for example, a computer system. The computer system is identical to the server system 200. Operations of the flow chart of the method 800, and combinations of operations in the flow chart of the method 800, may be implemented by, for example, hardware, firmware, a processor, circuitry, and/or a different device associated with the execution of software that includes one or more computer program instructions. It is noted that the operations of the method 800 can be described and/or practiced by using a system other than these computer systems. The method 800 starts at operation 802.

At operation 802, the method 800 includes accessing, by a server system 200, merchant-related transaction data associated with a merchant such as merchant 106A from a transaction database 118 associated with the server system 200. The merchant-related transaction data may include at least a set of merchant-related transaction indicators corresponding to payment transactions performed by a plurality of cardholders with the merchant 106A.

At operation 804, the method 800 includes generating, by the server system 200, a set of merchant-related transaction features based, at least in part, on the set of merchant-related transaction indicators.

At operation 806, the method 800 includes generating, by the server system 200 via one or more risk prediction models, for a payment transaction with the merchant, a set of merchant health and compliance risk scores 306, a set of merchant terminal risk scores 406, a set of merchant chargeback risk scores 506, and a set of merchant activity risk scores 606 based, at least in part, on the set of merchant-related transaction features. The one or more risk prediction models may include at least a merchant health and compliance risk prediction model 302, a merchant terminal risk prediction model 402, a merchant chargeback risk prediction model 502, and a merchant activity risk prediction model 602. In various non-limiting implementations, one or more risk prediction models may be implemented using any one or more machine learning algorithms/models such as, but not limited to rule-based models, classifier models, decision tree models, regressor models, etc., and the like. For instance, Gradient boosting models such as the Extreme gradient boosting (XGBoost) model. It is noted that both the XGBoost classifier and XGBoost regressor-based ML models may be used to determine or predict the various scores described herein. It is understood that the model architecture of one or more machine learning models may be adapted to predict the various scores described herein using their respective features.

At operation 808, the method 800 includes facilitating, by the server system 200, transmission of a notification message to an acquirer server 110 associated with the merchant 106A. The notification message may include at least the set of merchant health and compliance risk scores 306, the set of merchant terminal risk scores 406, the set of chargeback risk scores 506, and the set of merchant activity risk scores 606.

The sequence of operations of the method 800 need not be necessarily executed in the same order as they are presented. Further, one or more operations may be grouped together and performed in form of a single step, or one operation may have several sub-steps that may be performed in parallel or in a sequential manner.

Figure 9:
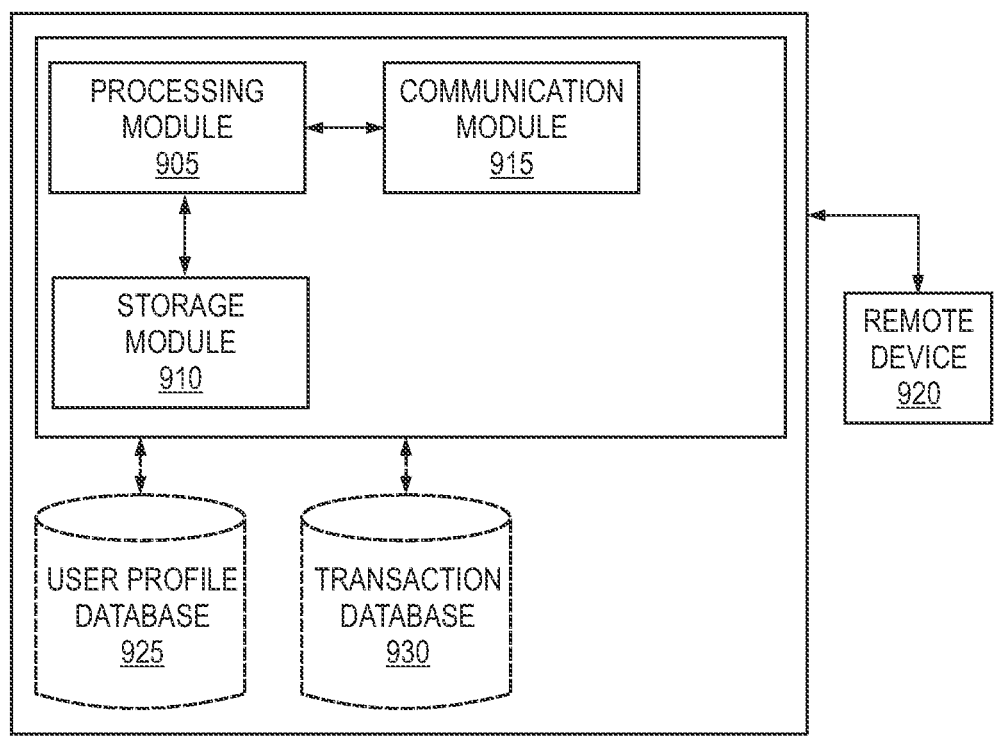
FIG. 9 illustrates a simplified block diagram of an acquirer server, in accordance with an embodiment of the present disclosure.

FIG. 9 illustrates a simplified block diagram of an acquirer server 900, in accordance with an embodiment of the present disclosure. The acquirer server 900 is an example of the acquirer server 110 of FIG. 1. The acquirer server 900 is associated with an acquirer bank/acquirer, in which a merchant (such as merchants 106) may have an account. The acquirer server 900 includes a processing module 905 operatively coupled to a storage module 910 and a communication module 915. The components of the acquirer server 900 provided herein may not be exhaustive and the acquirer server 900 may include more or fewer components than those depicted in FIG. 9. Further, two or more components may be embodied in one single component, and/or one component may be configured using multiple sub-components to achieve the desired functionalities. Some components of the acquirer server 900 may be configured using hardware elements, software elements, firmware elements and/or a combination thereof.

The storage module 910 is configured to store machine-executable instructions to be accessed by the processing module 905. Additionally, the storage module 910 stores information related to, the contact information of the merchants 106, bank account number, availability of funds in the account, transaction details and/or the like. Further, the storage module 910 is configured to store historical payment transactions associated with the merchants 106.

In one embodiment, the acquirer server 900 is configured to store profile data (e.g., an account balance, a credit line, details of the merchants 106, account identification information) in the database such as transaction database 930.

The processing module 905 is configured to communicate with one or more remote devices such as a remote device 920 using the communication module 915 over a network such as the network 112 of FIG. 1. The examples of the remote device 920 include the server system 102, the payment server 116, the database 120 or other computing systems of the acquirer server 900 and the network 112 and the like. The communication module 915 is capable of facilitating such operative communication with the remote devices and cloud servers using API (Application Program Interface) calls. The communication module 915 is configured to receive a payment transaction request performed by the cardholder 104 via the network 112. The processing module 905 receives a payment card information, a payment transaction amount, a cardholder information, and merchant information from the remote device 920 (i.e., the payment server 116). The acquirer server 900 includes a transaction database 930 for storing transaction data of the merchants 106. The transaction data may include, but not limited to, transaction attributes, such as transaction amount, source of funds such as bank or credit cards, transaction channel used for loading funds such as POS terminal or ATM machine, transaction velocity features such as count and transaction amount sent in the past x days to a particular user, transaction location information, external data sources, and other internal data to evaluate each transaction. The acquirer server 900 includes a user profile database 925 storing user profile associated with the plurality of merchants 106.

The user profile data may include an account balance, a credit line, account identification information, payment card number, or the like. The details of the merchant may include, but are not limited to, name, industry, location, physical attributes, registered contact number, merchant category code (MCC), alternate contact number, registered e-mail address, or the like of the plurality of merchant 106.

The disclosed method with reference to FIGS. 1 to 9 or one or more operations of the server system 102 may be implemented using software including computer-executable instructions stored on one or more computer-readable media (e.g., non-transitory computer-readable media, such as one or more optical media discs, volatile memory components (e.g., DRAM or SRAM)), or nonvolatile memory or storage components (e.g., hard drives or solid-state nonvolatile memory components, such as Flash memory components) and executed on a computer (e.g., any suitable computer, such as a laptop computer, netbook, Web book, tablet computing device, smartphone, or another mobile computing device). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during the implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software, and/or any combination of hardware, firmware, and/or software (for example, embodied in a machine-readable medium). For example, the apparatuses and methods may be embodied using transistors, logic gates, and electrical circuits (for example, application-specific integrated circuit (ASIC) circuitry and/or in Digital Signal Processor (DSP) circuitry).

Particularly, the server system 102 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or the computer to perform one or more operations. A computer-readable medium storing, embodying, or encoded with a computer program, or similar language may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g. magneto-optical disks), CD-ROM (compact disc read-only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different from those which, are disclosed. Therefore, although the invention has been described based on these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
    accessing, by a server system, merchant-related transaction data associated with a merchant from a transaction database associated with the server system, the merchant-related data comprising a set of merchant-related indicators;
    generating, by the server system, a set of merchant-related transaction features based, at least in part, on the set of merchant-related indicators;
    generating, by the server system via one or more risk prediction models, for a payment transaction with the merchant, a set of merchant health and compliance risk scores, a set of merchant terminal risk scores, a set of merchant chargeback risk scores, and a set of merchant activity risk scores based, at least in part, on the set of merchant-related transaction features, wherein the one or more risk prediction models comprise a merchant health and compliance risk prediction model, a merchant terminal risk prediction model that is a machine learning model and generates the set of merchant terminal risk scores, a merchant chargeback risk prediction model, and a merchant activity risk prediction model, wherein the set of merchant terminal risk scores includes an indication of whether a terminal comprising a computing device associated with the merchant is unable to read a chip of a payment card to complete a transaction to be less secure;
    facilitating, by the server system, transmission of a notification message to an acquirer server associated with the merchant, the notification message comprising the set of merchant health and compliance risk scores, the set of merchant terminal risk scores, the set of merchant chargeback risk scores, and the set of merchant activity risk scores; and
    fix, with the acquirer server, the terminal based on the indication so that the terminal is capable of reading chips of payment cards.

2. The computer-implemented method as claimed in claim 1, wherein the set of merchant-related indicators comprises a unique merchant identifier (ID), geo-location data, a payment means, timestamp information, a merchant industry, a merchant country, a merchant state, a merchant city, a merchant location ID, a transaction amount, a fraud transaction amount, a fraud count indicator, a transaction indicator, transaction currency, an acquiring bank, an acquiring country, an issuing bank, an issuing country, a card product type, an electronic commerce (e-commerce) indicator, a contactless payment indicator, a recurring transaction indicator, a user presence indicator, a cross-border transaction indicator, an average card visit indicator, an average card spend indicator, an average online transaction amount indicator, an average Point of Sale (POS) transaction amount indicator, an average cross-border transaction amount indicator, an average contactless transaction amount indicator, an average Personal Identification Number (PIN) transaction amount indicator, an average card present transaction amount indicator, an average transaction amount on card type indicator, a transaction amount ratio indicator, a card decline rate indicator, a fraud-related chargeback indicator, a non-fraud related chargeback indicator, a Merchant Category Code (MCC) risk indicator, a terminal data indicator, and a fallback transaction indicator.

3. The computer-implemented method as claimed in claim 1, wherein generating the set of merchant health and compliance risk scores, further comprises:
    determining, by the server system, a set of health and compliance-related transaction features based, at least in part, on the set of merchant-related transaction features, the set of health and compliance-related transaction features comprising merchant fraud risk data, ghost merchant risk data, merchant fraud attrition risk data, merchant circumvention risk data, merchant alternative identity data, and merchant account takeover risk data; and
    generating, by the server system via the merchant health and compliance risk prediction model, the set of merchant health and compliance risk scores based, at least in part, on the set of health and compliance-related transaction features, the set of merchant health and compliance risk scores comprising a merchant fraud risk score, a ghost merchant risk score, a merchant fraud attrition risk score, a merchant circumvention risk score, a merchant alternative identity score, and a merchant account takeover risk score.

4. The computer-implemented method as claimed in claim 1, wherein generating the set of merchant terminal risk scores, further comprises:
   determining, by the server system, a set of terminal-related transaction features based, at least in part, on the set of merchant-related transaction features, the set of terminal-related transaction features comprising chip failure data, terminal fraud attack risk data, and terminal information compromise data; and
   generating, by the server system via the merchant terminal risk prediction model, the set of merchant terminal risk scores based, at least in part, on the set of terminal-related transaction features, the set of merchant terminal risk scores comprising a chip failure risk score, a terminal fraud attack risk score, and a terminal information compromise score.

5. The computer-implemented method as claimed in claim 4, wherein generating the set of merchant chargeback risk scores, further comprises:
   determining, by the server system, a set of chargeback-related transaction features based, at least in part, on the set of merchant-related transaction features, the set of chargeback-related transaction features comprising fraud chargeback risk data, fraud chargeback Gross Dollar Value (GDV) data, and excessive return risk data; and
   generating, by the server system via the merchant chargeback risk prediction model, the set of merchant chargeback risk scores based, at least in part, on the set of terminal-related transaction features, the set of merchant chargeback risk prediction scores comprising a fraud chargeback risk score, a fraud chargeback GDV risk score, and an excessive return risk score.

6. The computer-implemented method as claimed in claim 4, wherein generating the set of merchant activity risk scores, further comprises:
   determining, by the server system, a set of activity related transaction features based, at least in part, on the set of merchant-related transaction features, the set of activity related transaction features comprises contactless adoption likelihood data, contactless adoption revenue data, contactless growth likelihood data, contactless growth revenue data, anomalous ticket risk data, anomalous time risk data, and anomalous sales risk data; and
   generating, by the server system via the merchant activity risk prediction model, the set of merchant activity risk scores based, at least in part, on the set of terminal-related transaction features, the set of merchant activity risk scores comprising a fraud contactless adoption likelihood score, a contactless adoption revenue score, a contactless growth likelihood score, a contactless growth revenue score, an anomalous ticket risk score, an anomalous time risk score, and an anomalous sales risk score.

7. The computer-implemented method as claimed in claim 1, further comprising:
   receiving, by the server system, an authentication request message for the payment transaction between a cardholder and the merchant from the acquirer server.

8. The computer-implemented method as claimed in claim 1, wherein facilitating the transmission of the notification message, further comprises:
   generating, by the server system, an updated authorization response message for the payment transaction based, at least in part, on an authorization response message associated with the payment transaction, the updated authorization response message comprising the set of merchant health and compliance risk scores, the set of merchant terminal risk scores, the set of merchant chargeback risk scores, and the set of merchant activity risk scores.

9. The computer-implemented method as claimed in claim 1, wherein the notification message is transmitted to the acquirer server via an Application Programming Interface (API) of an application associated with the acquirer server.

10. The computer-implemented method as claimed in claim 1, wherein the server system is a payment server associated with a payment network.

11. A computing environment, comprising:
   an acquirer server including:
      an acquirer memory configured to store acquirer instructions; and
      an acquirer processor in communication with the acquirer memory;
   a server system including:
      a server memory configured to store server instructions;
      a communication interface; and
      a server processor in communication with the server memory and the communication interface, the server processor configured to execute the server instructions stored in the server memory to cause the server system to;
      access merchant-related data associated with a merchant from a transaction database associated with the server system, the merchant-related data comprising a set of merchant-related transaction indicators;
      generate a set of merchant-related transaction features based, at least in part, on the set of merchant-related indicators;
      generate via one or more risk prediction models, for a payment transaction with the merchant, a set of merchant health and compliance risk scores, a set of merchant terminal risk scores, a set of merchant chargeback risk scores, and a set of merchant activity risk scores based, at least in part, on the set of merchant-related transaction features, wherein the one or more risk prediction models comprise a merchant health and compliance risk prediction model, a merchant terminal risk prediction model that is a machine learning model and generates the set of merchant terminal risk scores, a merchant chargeback risk prediction model, and a merchant activity risk prediction model, wherein the set of merchant terminal risk scores includes an indication of whether a terminal comprising a computing device associated with the merchant is unable to read a chip of a payment card to complete a transaction to be less secure;
      facilitate transmission of a notification message to the acquirer server that is associated with the merchant, the notification message comprising the set of merchant health and compliance risk scores, the set of merchant terminal risk scores, the set of merchant chargeback risk scores, and the set of merchant activity risk scores; and wherein the acquirer processor is configured to execute the acquirer instructions stored in the acquirer memory to cause the acquirer server to fix the terminal based on the indication so that the terminal is capable of reading chips of payment cards.

12. The computing environment as claimed in claim 11, wherein the set of merchant-related indicators comprises a unique merchant identifier (ID), geo-location data, a payment means, timestamp information, a merchant industry, a merchant country, a merchant state, a merchant city, a merchant location ID, a transaction amount, a fraud transaction amount, a fraud count indicator, a transaction indicator, transaction currency, an acquiring bank, an acquiring country, an issuing bank, an issuing country, a card product type, an electronic commerce (e-commerce) indicator, a contactless payment indicator, a recurring transaction indicator, a user presence indicator, a cross-border transaction indicator, an average card visit indicator, an average card spend indicator, an average online transaction amount indicator, an average Point of Sale (POS) transaction amount indicator, an average cross-border transaction amount indicator, an average contactless transaction amount indicator, an average Personal Identification Number (PIN) transaction amount indicator, an average card present transaction amount indicator, an average transaction amount on card type indicator, a transaction amount ratio indicator, a card decline rate indicator, a fraud-related chargeback indicator, a non-fraud related chargeback indicator, a Merchant Category Code (MCC) risk indicator, a terminal data indicator, and a fallback transaction indicator.

13. The computing environment as claimed in claim 11, wherein to generate the set of merchant health and compliance risk scores, the server system is further caused, at least in part, to:
determine a set of health and compliance-related transaction features based, at least in part, on the set of merchant-related transaction features, the set of health and compliance-related transaction features comprising merchant fraud risk data, ghost merchant risk data, merchant fraud attrition risk data, merchant circumvention risk data, merchant alternative identity data, and merchant account takeover risk data; and
generate via the merchant health and compliance risk prediction model, the set of merchant health and compliance risk scores based, at least in part, on the set of health and compliance-related transaction features, the set of merchant health and compliance risk scores comprising a merchant fraud risk score, a ghost merchant risk score, a merchant fraud attrition risk score, a merchant circumvention risk score, a merchant alternative identity score, and a merchant account takeover risk score.

14. The computing environment as claimed in claim 11, wherein to generate the set of merchant terminal risk scores, the server system is further caused, at least in part, to:
determine a set of terminal-related transaction features based, at least in part, on the set of merchant-related transaction features, the set of terminal-related transaction features comprising chip failure data, terminal fraud attack risk data, and terminal information compromise data; and
generate via the merchant terminal risk prediction model, the set of merchant terminal risk scores based, at least in part, on the set of terminal-related transaction features, the set of merchant terminal risk scores comprising a chip failure risk score, a terminal fraud attack risk score, and a terminal information compromise score.

15. The computing environment as claimed in claim 14, wherein to generate the set of merchant chargeback risk scores, the server system is further caused, at least in part, to:
determine a set of chargeback-related transaction features based, at least in part, on the set of merchant-related transaction features, the set of chargeback-related transaction features comprising fraud chargeback risk data, fraud chargeback Gross Dollar Value (GDV) data, and excessive return risk data; and
generate via the merchant chargeback risk prediction model, the set of merchant chargeback risk scores based, at least in part, on the set of terminal-related transaction features, the set of merchant chargeback risk prediction scores comprising a fraud chargeback risk score, a fraud chargeback GDV risk score, and an excessive return risk score.

16. The computing environment as claimed in claim 14, wherein to generate the set of merchant activity risk scores, the server system is further caused, at least in part, to:
determine a set of activity related transaction features based, at least in part, on the set of merchant-related transaction features, the set of activity related transaction features comprises contactless adoption likelihood data, contactless adoption revenue data, contactless growth likelihood data, contactless growth revenue data, anomalous ticket risk data, anomalous time risk data, and anomalous sales risk data; and
generate via the merchant activity risk prediction model, the set of merchant activity risk scores based, at least in part, on the set of terminal-related transaction features, the set of merchant activity risk scores comprising a fraud contactless adoption likelihood score, a contactless adoption revenue score, a contactless growth likelihood score, a contactless growth revenue score, an anomalous ticket risk score, an anomalous time risk score, and an anomalous sales risk score.

17. The computing environment as claimed in claim 11, wherein, the server system is further caused, at least in part, to:
receive an authentication request message for the payment transaction between a cardholder and the merchant from the acquirer server.

18. The computing environment as claimed in claim 11, wherein to facilitate the transmission of the notification message, the server system is further caused, at least in part, to:
generate an updated authorization response message for the payment transaction based, at least in part, on an authorization response message associated with the payment transaction, the updated authorization response message comprising the set of merchant health and compliance risk scores, the set of merchant terminal risk scores, the set of merchant chargeback risk scores, and the set of merchant activity risk scores.

19. The computing environment as claimed in claim 11, wherein the notification message is transmitted to the acquirer server via an Application Programming Interface (API) of an application associated with the acquirer server.

20. Non-transitory computer-readable storage media comprising computer-executable instructions that, when executed by at least a processor of a server system and a processor of an acquirer server, cause the server system and the acquirer server to perform a method comprising:
accessing, with the server system, merchant-related transaction data associated with a merchant from a transaction database associated with the server system, the merchant-related data comprising a set of merchant-related indicators;

generating, with the server system, a set of merchant-related transaction features based, at least in part, on the set of merchant-related indicators;

generating, with the server system, via one or more risk prediction models, for a payment transaction with the merchant, a set of merchant health and compliance risk scores, a set of merchant terminal risk scores, a set of merchant chargeback risk scores, and a set of merchant activity risk scores based, at least in part, on the set of merchant-related transaction features, wherein the one or more risk prediction models comprise a merchant health and compliance risk prediction model, a merchant terminal risk prediction model that is a machine learning model and generates the set of merchant terminal risk scores, a merchant chargeback risk prediction model, and a merchant activity risk prediction model, wherein the set of merchant terminal risk scores includes an indication of whether a terminal comprising a computing device associated with the merchant is unable to read a chip of a payment card to complete a transaction to be less secure;

facilitating, with the server system, transmission of a notification message to the acquirer server that is associated with the merchant, the notification message comprising the set of merchant health and compliance risk scores, the set of merchant terminal risk scores, the set of merchant chargeback risk scores, and the set of merchant activity risk scores; and fix, with the acquirer server, the terminal based on the indication so that the terminal is capable of reading chips of payment cards.

* * * * *